US 12,067,494 B2

United States Patent
Hayaishi et al.

(10) Patent No.: US 12,067,494 B2
(45) Date of Patent: Aug. 20, 2024

(54) COUNTING APPARATUS, LEARNING MODEL PRODUCING APPARATUS, COUNTING METHOD, AND LEARNING MODEL PRODUCING METHOD

(71) Applicant: KEISUUGIKEN CORPORATION, Osaka (JP)

(72) Inventors: Naohiro Hayaishi, Osaka (JP); Kazuma Takahara, Osaka (JP)

(73) Assignee: KEISUUGIKEN CORPORATION, Osaka (JP)

( * ) Notice: Subject to any disclaimer, the term of this patent is extended or adjusted under 35 U.S.C. 154(b) by 213 days.

(21) Appl. No.: 17/252,858

(22) PCT Filed: Jan. 31, 2020

(86) PCT No.: PCT/JP2020/003594
§ 371 (c)(1),
(2) Date: Dec. 16, 2020

(87) PCT Pub. No.: WO2020/158909
PCT Pub. Date: Aug. 6, 2020

(65) Prior Publication Data
US 2021/0216827 A1 Jul. 15, 2021

(30) Foreign Application Priority Data
Feb. 1, 2019 (JP) ................. 2019-017024

(51) Int. Cl.
*G06N 3/084* (2023.01)
*G06F 18/21* (2023.01)
(Continued)

(52) U.S. Cl.
CPC ........... *G06N 3/084* (2013.01); *G06F 18/214* (2023.01); *G06F 18/217* (2023.01); *G06N 20/00* (2019.01);
(Continued)

(58) Field of Classification Search
None
See application file for complete search history.

(56) References Cited

U.S. PATENT DOCUMENTS 9,704,259 B2 *  7/2017  Ito ............................ G06T 7/12
10,636,519 B2 *  4/2020  Royaee ................. B07C 5/3422
(Continued)

FOREIGN PATENT DOCUMENTS

JP      2010-198566 A    9/2010
JP      2011-181015 A    9/2011
(Continued)

OTHER PUBLICATIONS

International Search Report issued in corresponding International Patent Application No. PCT/JP2020/003594 dated Mar. 2, 2020, with English translation.
(Continued)

*Primary Examiner* — Soo Shin
(74) *Attorney, Agent, or Firm* — Troutman Pepper Hamilton Sanders LLP

(57) ABSTRACT

A counting apparatus includes: a storage unit storing a learning model, the learning model being trained using multiple pairs of training input images each obtained by capturing an image of multiple count target objects with the same shape, and training output images each containing teaching figures that are arranged at respective positions of the multiple count target objects. A captured image acquiring unit acquiring a captured image of multiple count target objects; an output image acquiring unit acquiring an output image in which the count target objects contained in the captured image are converted into count target figures, by applying the captured image to the learning model. A counting unit counting the number of count target objects, using the multiple count target figures contained in the
(Continued)

output image; and an output unit outputting the number of count target objects counted by the counting unit.

6 Claims, 44 Drawing Sheets

(51) Int. Cl.
*G06F 18/214* (2023.01)
*G06N 20/00* (2019.01)
*G06V 10/20* (2022.01)
*G06V 10/26* (2022.01)
*G06V 10/44* (2022.01)
*G06V 10/56* (2022.01)
*G06V 10/82* (2022.01)
*G06V 20/66* (2022.01)

(52) U.S. Cl.
CPC .......... *G06V 10/255* (2022.01); *G06V 10/26* (2022.01); *G06V 10/454* (2022.01); *G06V 10/56* (2022.01); *G06V 10/82* (2022.01); *G06V 20/66* (2022.01)

(56) References Cited

U.S. PATENT DOCUMENTS

| | | | | |
|---|---|---|---|---|
| 11,145,397 | B1* | 10/2021 | Myers | G06V 40/20 |
| 2005/0251347 | A1* | 11/2005 | Perona | G06V 20/693 |
| | | | | 382/128 |
| 2007/0189597 | A1* | 8/2007 | Limer | G06F 18/00 |
| | | | | 382/128 |
| 2012/0189177 | A1* | 7/2012 | Oh | H04N 5/44 |
| | | | | 382/128 |
| 2012/0327211 | A1 | 12/2012 | Yamamoto | |
| 2013/0127959 | A1* | 5/2013 | Hanina | G06V 20/66 |
| | | | | 347/101 |
| 2016/0234464 | A1* | 8/2016 | Loce | G06V 20/52 |
| 2018/0285682 | A1* | 10/2018 | Najibi | G06T 7/194 |
| 2022/0058439 | A1* | 2/2022 | Lee | G06V 10/17 |

FOREIGN PATENT DOCUMENTS

| | | |
|---|---|---|
| JP | 2018-22395 A | 2/2018 |
| JP | 2019-76063 A | 5/2019 |
| WO | 2004/073391 A1 | 9/2004 |
| WO | 2018/116851 A1 | 6/2018 |

OTHER PUBLICATIONS

Notice of Reasons for Refusal issued Japanese Patent Application No. 2019-017024 dated Jun. 19, 2019, with English translation.
Notice of Reasons for Refusal issued Japanese Patent Application No. 2019-017024 dated Oct. 25, 2019, with English translation.

* cited by examiner

| | Figure | Confidence Level (%) |
|---|---|---|
| Teaching figure |  | – |
| Count Target Object 1 |  | 95 |
| Count Target Object 2 |  | 85 |
| Count Target Object 3 |  | 75 |
| Count Target Object 4 |  | 65 |

| Layer | Filter Size | Stride | Output Map Size | Number of Parameters |
|---|---|---|---|---|
| Input | — | — | 128 × 128 × 3 | — |
| conv1 | 5 × 5 × 32 | 2 | 64 × 64 × 32 | 2400 |
| conv2 | 5 × 5 × 64 | 2 | 32 × 32 × 64 | 51200 |
| conv3 | 5 × 5 × 128 | 2 | 16 × 16 × 128 | 204800 |
| conv4 | 5 × 5 × 256 | 2 | 8 × 8 × 256 | 819200 |
| Enlarging Layer 1 | — | — | 16 × 16 × 64 | — |
| conv5 | 5 × 5 × 64 | 1 | 16 × 16 × 64 | 102400 |
| Enlarging Layer 2 | — | — | 32 × 32 × 16 | — |
| conv6 | 5 × 5 × 16 | 1 | 32 × 32 × 16 | 6400 |
| Enlarging Layer 3 | — | — | 64 × 64 × 4 | — |
| conv7 | 5 × 5 × 4 | 1 | 64 × 64 × 4 | 400 |
| Enlarging Layer 4 | — | — | 128 × 128 × 1 | — |

FIG.14A

COUNTING APPARATUS, LEARNING MODEL PRODUCING APPARATUS, COUNTING METHOD, AND LEARNING MODEL PRODUCING METHOD

CROSS REFERENCE TO RELATED APPLICATIONS

This is a U.S. National Phase Application under 35 U.S.C. § 371 of International Patent Application No. PCT/JP2020/003594, filed Jan. 31, 2020, which claims priority of Japanese Patent Application No. 2019-017024, filed Feb. 1, 2019. The entire contents of which are hereby incorporated by reference.

TECHNICAL FIELD

The present invention relates to a counting apparatus and the like for counting the number of count target objects.

BACKGROUND

Conventionally, there are methods for counting count target objects, by performing matching processing using a geometric model automatically generated using an image capturing guide, in a captured image of a mass of count target objects (see JP 2018-022395A, for example).

SUMMARY OF INVENTION

However, conventional counting methods are problematic in that, since matching processing using a geometric model is performed, if a geometric model is not properly generated, the level of accuracy in counting tends to be low. The level of accuracy in counting seems to be low when the shapes of multiple count target objects are slightly different from each other.

The present invention was arrived at in order to solve the above-described problem, and it is an object thereof to provide a counting apparatus and the like capable of improving the level of accuracy in counting.

In order to achieve the above-described object, the present invention is directed to a counting apparatus including: a storage unit in which a learning model is stored, the learning model being trained using multiple pairs of training input images each obtained by capturing an image of multiple count target objects with the same shape, and training output images each containing teaching figures that are arranged at respective positions of the multiple count target objects; a captured image acquiring unit that acquires a captured image of multiple count target objects; an output image acquiring unit that acquires an output image in which the count target objects contained in the captured image are converted into count target figures, by applying the captured image to the learning model; a counting unit that counts the number of count target objects, using the multiple count target figures contained in the output image; and an output unit that outputs the number of count target objects counted by the counting unit.

With this configuration, it is possible to acquire the number of count target objects, by converting count target objects contained in a captured image into count target figures using a learning model. Since the level of accuracy in converting count target objects into count target figure is high, it is possible to more accurately count the count target objects. For example, when using a learning model trained using training input images of count target objects with slightly different shapes, it is also possible to properly count the count target objects with slightly different shapes.

Furthermore, the counting apparatus according to the present invention may be such that the counting apparatus further includes a confidence level acquiring unit that acquires, for each count target figure contained in the output image, a confidence level that increases in accordance with an attribute of the count target figure being closer to an attribute of a teaching figure, and the counting unit counts the number of count target figures with a confidence level that is greater than a threshold.

With this configuration, it is possible to perform more accurate counting, by using confidence levels acquired from count target figures. For example, even when the shapes of multiple count target objects are slightly different from each other, it is possible to perform proper counting, by properly adjusting a threshold.

Furthermore, the counting apparatus according to the present invention may be such that there are count target objects of multiple types in terms of size, the learning model is trained using teaching figures with an attribute that is different for each size of count target objects, and the counting unit also counts the number of count target objects with a size for which learning has not been performed, using attributes and confidence levels of count target figures contained in the output image.

With this configuration, it is also possible to count the number of count target objects for which learning has not been performed.

Also, the present invention is directed to a learning model producing apparatus including: a training image accepting unit that accepts multiple pairs of training input images each obtained by capturing an image of multiple count target objects with the same shape, and training output images each containing teaching figures that are arranged at respective positions of the multiple count target objects; a learning model producing unit that produces a learning model through learning of the multiple pairs of the training input images and the training output images; and a learning model output unit outputs the learning model.

With this configuration, it is possible to produce a learning model for use in counting count target objects.

Furthermore, the learning model producing apparatus according to the present invention may be such that there are count target objects of multiple types, and the training image accepting unit accepts a training output image containing teaching figures with an attribute that is different for each type of count target objects.

With this configuration, it is possible to count multiple types of count target objects, by using the produced learning model.

Furthermore, the learning model producing apparatus according to the present invention may be such that the training image accepting unit accepts pairs of training input images and training output images for each type of count target objects.

With this configuration, it is possible to generate a learning model using a smaller number of pairs of training input images and training output images than when performing learning using one training input image containing multiple types of count target objects.

Furthermore, the learning model producing apparatus according to the present invention may be such that the type of count target objects is a type in terms of size of the count target objects.

With this configuration, it is possible to count the count target objects for each of the multiple sizes, by using the produced learning model.

Furthermore, the learning model producing apparatus according to the present invention may be such that the teaching figures are figures without directionality.

With this configuration, the orientations of teaching figures do not have to be considered, and thus it is easy to prepare training output images, and to efficiently perform learning using a smaller number of training images.

Furthermore, the learning model producing apparatus according to the present invention may be such that the teaching figures are figures with directionality, wherein directions thereof are set according to directions of the count target objects in the training input image.

With this configuration, for example, it is possible to realize more accurate counting of count target objects whose directions conform to each other due to the influence of gravity and the like. For example, if the counting apparatus is set such that count target figures at angles that are not in a direction to which count target figures are to conform are not counted, even when a background of the count target objects or the like contains objects with a shape that is similar to that of the count target figures, the objects are prevented from being erroneously counted, as long as the angle of the objects with such a shape is different from that of the count target figures, and thus it is possible to realize more accurate counting.

Also, the present invention is directed to a learning model of a learning result of multiple pairs of training input images each obtained by capturing an image of multiple count target objects with the same shape, and training output images each containing teaching figures that are arranged at respective positions of the multiple count target objects, wherein, upon application of a captured image of multiple count target objects, an output image can be acquired in which the count target objects contained in the captured image are converted into count target figures.

Also, the present invention is directed to a counting method including: a captured image acquiring step of acquiring a captured image of multiple count target objects; an output image acquiring step of acquiring an output image in which the count target objects contained in the captured image are converted into count target figures, by applying the captured image to a learning model trained using multiple pairs of training input images each obtained by capturing an image of the multiple count target objects with the same shape, and training output images each containing teaching figures that are arranged at respective positions of the multiple count target objects; a counting step of counting the number of count target objects, using the multiple count target figures contained in the output image; and an output step of outputting the number of count target objects counted in the counting step.

Also, the present invention is directed to a learning model producing method including: a training image accepting step of accepting multiple pairs of training input images each obtained by capturing an image of multiple count target objects with the same shape, and training output images each containing teaching figures that are arranged at respective positions of the multiple count target objects; a learning model producing step of producing a learning model through learning of the multiple pairs of the training input images and the training output images; and a learning model output step of outputting the learning model.

With the counting apparatus and the like according to the present invention, it is possible to realize accurate counting.

BRIEF DESCRIPTION OF DRAWINGS

FIG. 14A is a diagram showing an example of layers constituting a neural network according to the embodiment.

DETAILED DESCRIPTION

Figure 1:
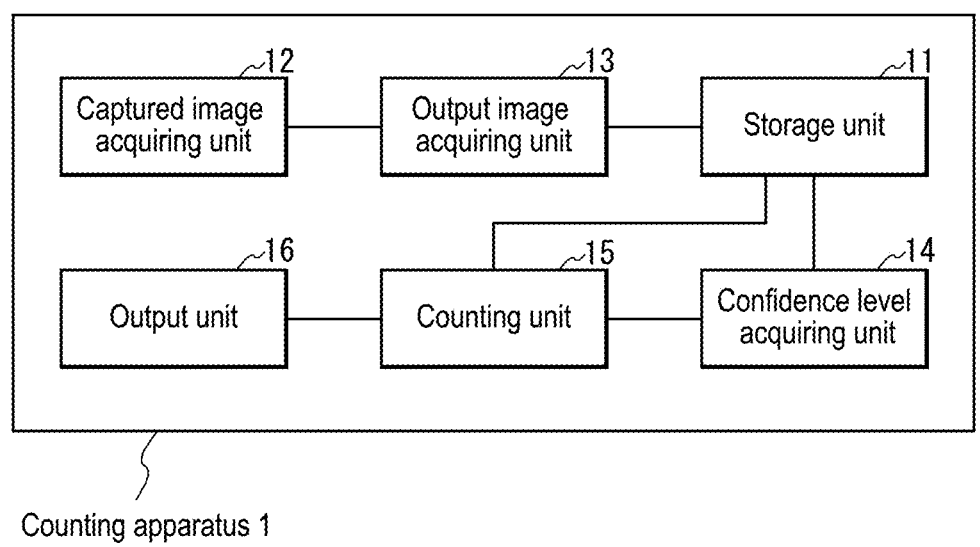
FIG. 1 is a block diagram showing the configuration of a counting apparatus according to an embodiment of the present invention.

Hereinafter, a counting apparatus and a learning model producing apparatus according to the present invention will be described by way of an embodiment. It should be noted that constituent elements and steps denoted by the same reference numerals in the embodiments are the same or corresponding constituent elements and steps, and thus a description thereof may be omitted. The counting apparatus according to this embodiment counts the number of count target objects, by converting count target objects contained in a captured image into figures, using a learning model trained using training input images and training output images. The learning model producing apparatus according to this embodiment can produce a learning model for use in counting count target objects, by performing learning using multiple pairs of training input images and training output images.

FIG. 1 is a block diagram showing the configuration of a counting apparatus 1 according to this embodiment. The counting apparatus 1 according to this embodiment includes a storage unit 11, a captured image acquiring unit 12, an output image acquiring unit 13, a confidence level acquiring unit 14, a counting unit 15, and an output unit 16. For example, the counting apparatus 1 may be a personal computer, a portable information processing terminal such as a smartphone, a tablet device, or a PDA (personal digital assistant), a dedicated apparatus for performing counting processing, or a server or the like.

A learning model is stored in the storage unit 11. The learning model is trained using multiple pairs of training input images each obtained by capturing an image of multiple count target objects with the same shape, and training output images each containing teaching figures that are arranged at respective positions of the multiple count target objects. A pair of a training input image and a training output image may be referred to as training images. The learning model may be, for example, a learning result of a neural network (NN), a learning result of a support vector machine (SVM) or support vector regression (SVR), or a learning result of other machine learning.

The neural network may be, for example, a convolutional neural network (CNN), or other neural network (e.g., a neural network constituted by fully connected layers, etc.). The convolutional neural network is a neural network having one or more convolutional layers. If a neural network has at least one intermediate layer (hidden layer), learning of the neural network may be considered as deep learning. If a neural network is used for machine learning, the number of layers, the number of nodes in each layer, the type of each layer (e.g., a convolutional layer, a fully connected layer, etc.), and the like of the neural network may be selected as appropriate. The number of nodes in the input layer and the output layer is typically determined by a training input image and a training output image contained in training images. In this embodiment, a case will be mainly described in which the learning model is a learning result of a CNN, and other cases will be described later.

The state in which a learning model is stored in the storage unit 11 may be, for example, a state in which a learning model itself (e.g., a function of outputting a value for input, a learning result model, etc.) is stored, or a state in which information such as a parameter necessary to constitute a learning model is stored. The reason for this is that, even in the case of the latter, it is possible to constitute a learning model using the information such as a parameter, and thus it can be considered that a learning model is substantially stored in the storage unit 11. In this embodiment, a case will be mainly described in which a learning model itself is stored in the storage unit 11.

There is no limitation on the procedure in which a learning model is stored in the storage unit 11. For example, a learning model may be stored in the storage unit 11 via a storage medium, or a learning model transmitted via a communication line or the like may be stored in the storage unit 11. The storage in the storage unit 11 may be storage in a RAM or the like maintained temporarily or for a long period of time. The storage unit 11 may be realized by a predetermined storage medium (e.g., a semiconductor memory, a magnetic disk, an optical disk, etc.).

Figure 2:
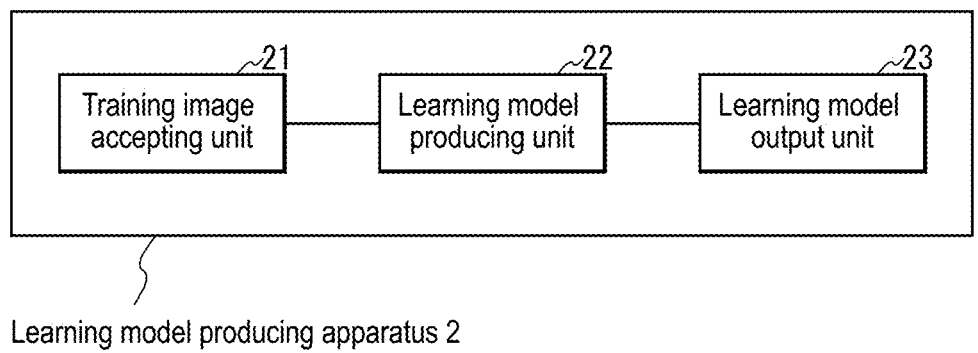
FIG. 2 is a block diagram showing the configuration of a learning model producing apparatus according to the embodiment.

Hereinafter, the processing for generating a learning model will be described. FIG. 2 is a block diagram showing the configuration of a learning model producing apparatus 2 according to this embodiment. The learning model producing apparatus 2 according to this embodiment includes a training image accepting unit 21, a learning model producing unit 22, and a learning model output unit 23. The learning model producing apparatus 2 is typically an information processing apparatus for performing learning, but it may be for example, a general-purpose apparatus such as a portable information processing terminal, a dedicated apparatus for performing learning, or a server or the like.

The training image accepting unit 21 accepts multiple pairs of training input images each obtained by capturing an image of multiple count target objects with the same shape, and training output images each containing teaching figures that are arranged at respective positions of the multiple count target objects.

It is preferable that the multiple count target objects have the same shape as described above. The same shape may be strictly the same shape, or substantially the same shape. It is also possible that the multiple count target objects have the same size. The same size may be strictly the same size, or substantially the same size. For example, in the case in which count target objects are natural objects such as agricultural products, in the strict sense, the shapes and the sizes of the count target objects may be slightly different from each other, but they may be considered as the same shape and the same size, as long as they can be judged as substantially the same shape and substantially the same size. Specifically, soybeans, grains of rice, seeds of plants, and the like may be considered as having the same shape and the same size. For example, also in the case in which count target objects are artificial objects such as screws or bolts, in the strict sense, the shapes and the sizes of the count target objects may be slightly different from each other although the levels of the differences seem to be smaller than those of natural objects. Even in that case, they may be considered as the same shape and the same size, as long as they can be judged as substantially the same shape and substantially the same size. Whether or not objects have the same size is typically judged based on the size according to the number of pixels. It is preferable that multiple count target objects contained in training input images contain various shapes and sizes of the count target objects that are to be counted. For example, in the case in which count target objects are natural objects as described above, the shapes and the sizes thereof may be slightly different from each other, but it is preferable that various count target objects with such slight differences are contained in training input images. The reason for this is that, with this configuration, it is possible to realize counting that is not affected by such differences. In this embodiment, a case will be mainly described in which multiple count target objects have the same shape and the same size.

It is preferable that teaching figures are typically figures that are smaller than count target objects. The reason for this is that, with this configuration, it is possible to convert count target objects into count target figures as will be described later even when count target objects partially overlap each other, unless the count target objects do not completely overlap each other. It is preferable that teaching figures are arranged at positions corresponding to the centers of count target objects, but there is no limitation to this. However, even when teaching figures are arranged at positions not corresponding to the centers of count target objects, it is preferable that the teaching figures are arranged at positions corresponding to predetermined positions of the count target objects.

There is no limitation on the shape of teaching figures, but, for example, the teaching figures may be figures without directionality. Figures without directionality are figures whose shape does not change even when rotated in an image, and examples thereof include those with a ring shape, a disc-like shape, and the like. Typically, it is preferable that teaching figures without directionality are used. Meanwhile, teaching figures may be, for example, figures with directionality. Examples of teaching figures with directionality include those with a triangular shape, a quadrangular shape, a polygonal shape, a linear shape, and the like. If teaching figures are figures with directionality, the direction of each teaching figure contained in a training output image may be set according to the direction of a count target object in a training input image. If count target objects are linear objects such as toothpicks or pencils in a captured image, for example, linear teaching figures with directionality may be used. In that case, for example, the teaching figures may be arranged such that the longitudinal directions of the linear count target objects match the longitudinal directions of the teaching figures. If count target objects have shapes with directionality and conform to a certain direction, for example, teaching figures with directionality may be used. In that case, it is preferable that, for example, the orientations (angles) of the teaching figures are determined according to the shapes of the count target objects. For example, if count target objects have a square shape, the teaching figures may be arranged at positions corresponding to the centers of the count target objects such that the directions of the sides of the square teaching figures respectively conform to the sides of the count target objects. Since the count target objects conform to a certain direction as described above, if the difference between the angles of the count target objects seems to be sufficiently small, the teaching figures may be arranged at the same angle that is along the direction to which the count target objects conform.

In the case of counting multiple types of count target objects, the training image accepting unit 21 may accept training output images containing teaching figures with an attribute that is different for each type of count target objects. The type of count target objects may be, for example, a type in terms of shape, a type in terms of size, a type in terms of color, or a type in terms of other aspects, or may be a combination of any two or more thereof. Example of the count target objects with different shapes and different sizes include soybeans and grains of rice. Example of the count target objects with different sizes include nuts with different sizes. Example of the target objects with different colors include ordinary soybeans and green soybeans. The attribute of teaching figures may be, for example, a color (e.g., at least one or more of hue, saturation, and lightness, etc.), a shape, or other attributes. For example, if soybeans and grains of rice are provided as count target objects, red teaching figures may be used for the soybeans, and blue teaching figures may be used for the grains of rice.

In the case of counting multiple types of count target objects, the training image accepting unit 21 may accept pairs of training input images and training output images for each type of count target objects. That is to say, one pair of training images may contains a training input image containing only one type of count target objects, and a training output image containing only teaching figures with an attribute corresponding to the count target objects. For example, if soybeans and grains of rice are provided as count target objects, the training image accepting unit 21 may accept multiple pairs of training input images and training output images regarding soybeans, and multiple pairs of training input images and training output information regarding grains of rice. When performing learning using pairs of training input images and training output images for each type of count target objects in this manner, it is possible to generate a proper learning model using a smaller number of training images than when performing learning using pairs of training input images and training output information containing multiple types of count target objects in a mixed manner.

Furthermore, in order to calculate a later-described confidence level, it is preferable that teaching figures have a predetermined attribute such as a shape or a color. For example, the shape and the size of teaching figures may be predetermined. For example, a color attribute (e.g., lightness, hue, or saturation) of teaching figures may be predetermined. In that case, for example, all color attributes of pixels constituting the teaching figures may be the same.

FIGS. 5 to 8 are diagrams showing an example of training images. FIG. 5A is a training input image of count target objects that are soybeans, and FIG. 5B is a training output image containing teaching figures without directionality (i.e., disc-like teaching figures) that are arranged at respective positions of the soybeans in the training input image in FIG. 5A. FIG. 5C is a reference diagram obtained by compositing the training input image in FIG. 5A and the training output image in FIG. 5B. As shown in FIG. 5C, the teaching figures are arranged at the centers of the count target objects.

Figure 6A:
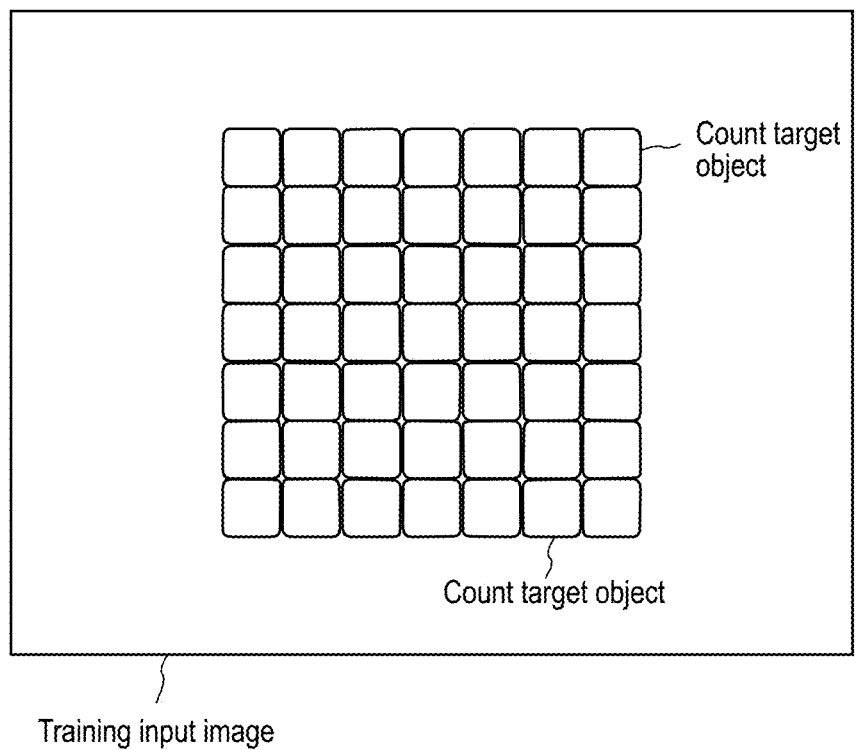
FIG. 6A is a diagram showing an example of a training input image according to the embodiment.
Figure 6B:
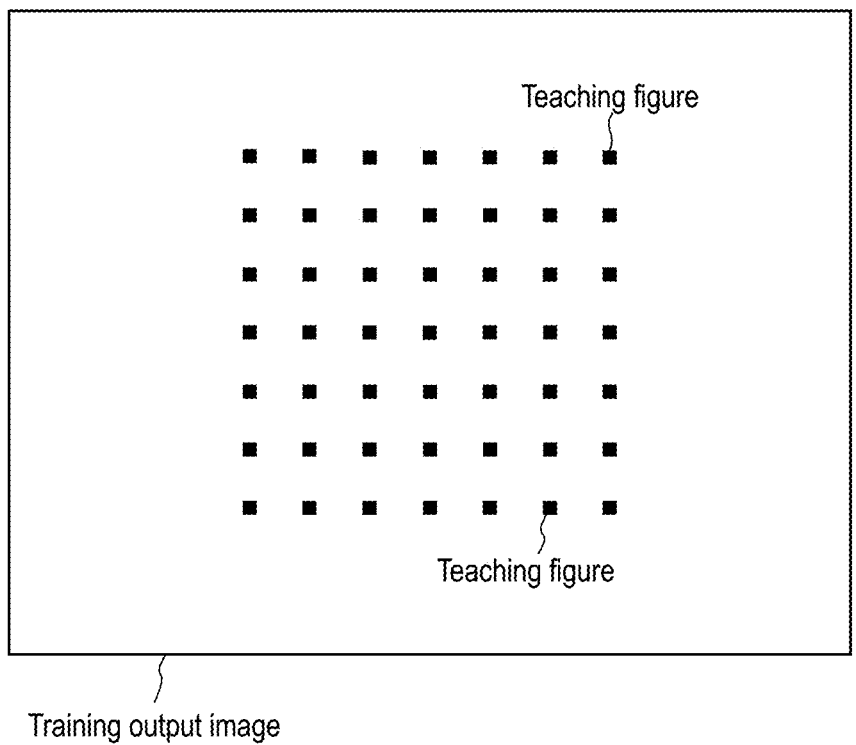
FIG. 6B is a diagram showing an example of a training output image according to the embodiment.
Figure 6C:
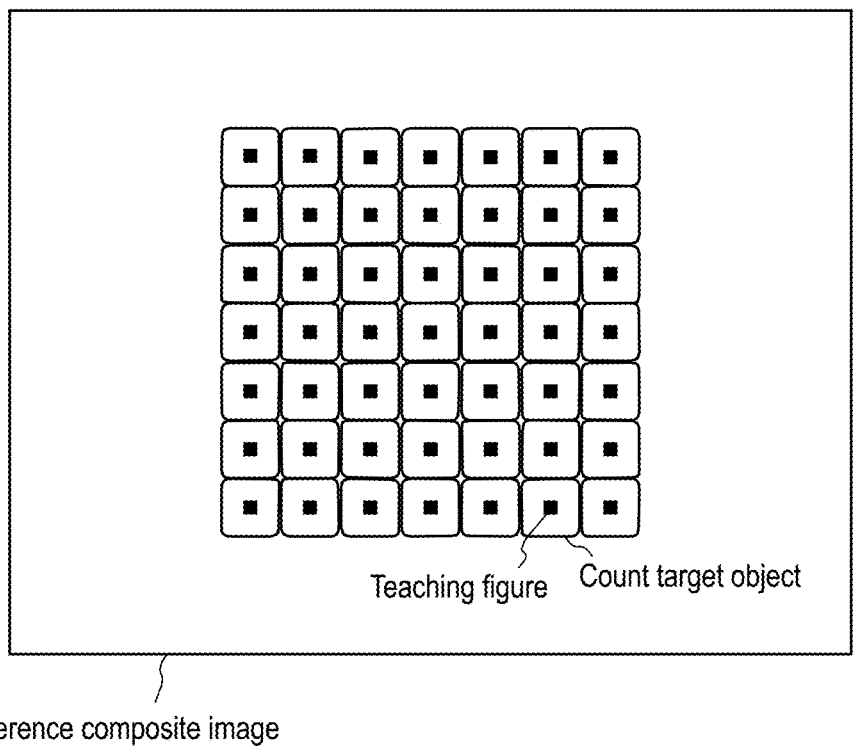
FIG. 6C is a diagram showing an example of a reference composite image according to the embodiment.

FIG. 6A is a training input image obtained by capturing an image of end portions of count target objects that are multiple pieces of dried noodles with square cross-sections in a state of being stacked one on top of another, and FIG. 6B is a training output image containing teaching figures with directionality that are arranged at respective positions of the dried noodles in the training input image in FIG. 6A. In FIG. 6B, teaching figures with directionality (i.e., square teaching figures) are used, and thus the teaching figures are arranged at end portions of linear dried noodles that are count target objects, in a direction in which the sides of the teaching figures respectively conform to the sides of the square count target objects. FIG. 6C is a reference diagram obtained by compositing the training input image in FIG. 6A and the training output image in FIG. 6B. As shown in FIG. 6C, the teaching figures are arranged at the centers of the count target objects such that the orientations thereof conform to those of the count target objects.

Figure 7A:
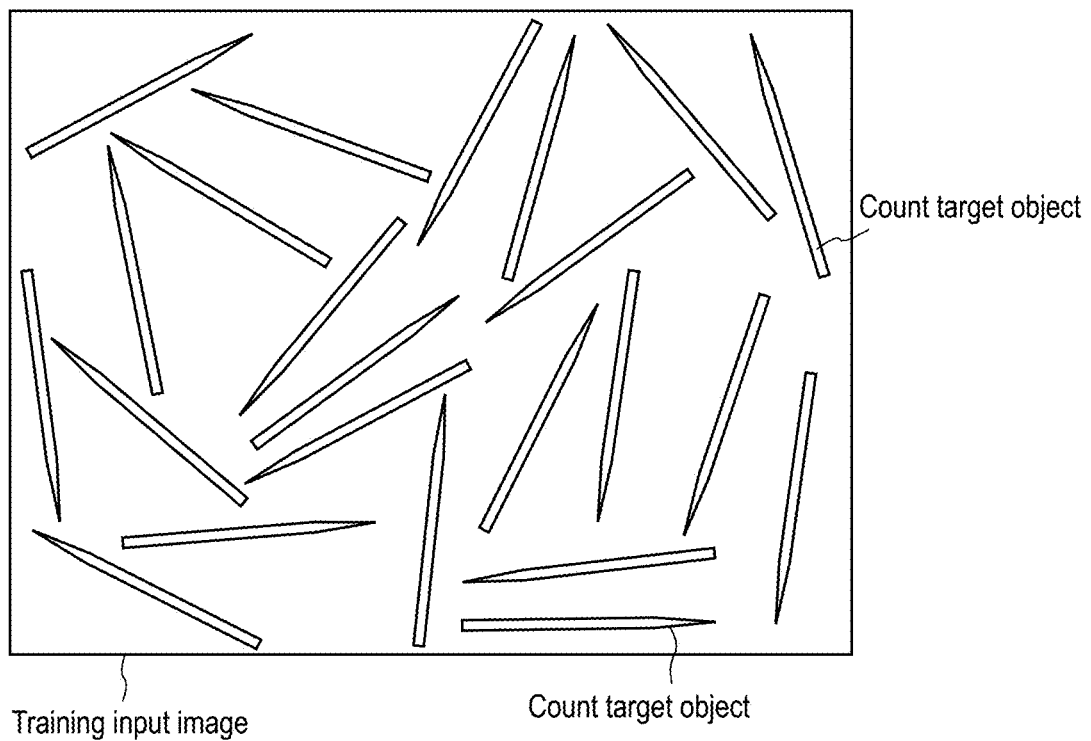
FIG. 7A is a diagram showing an example of a training input image according to the embodiment.
Figure 7B:
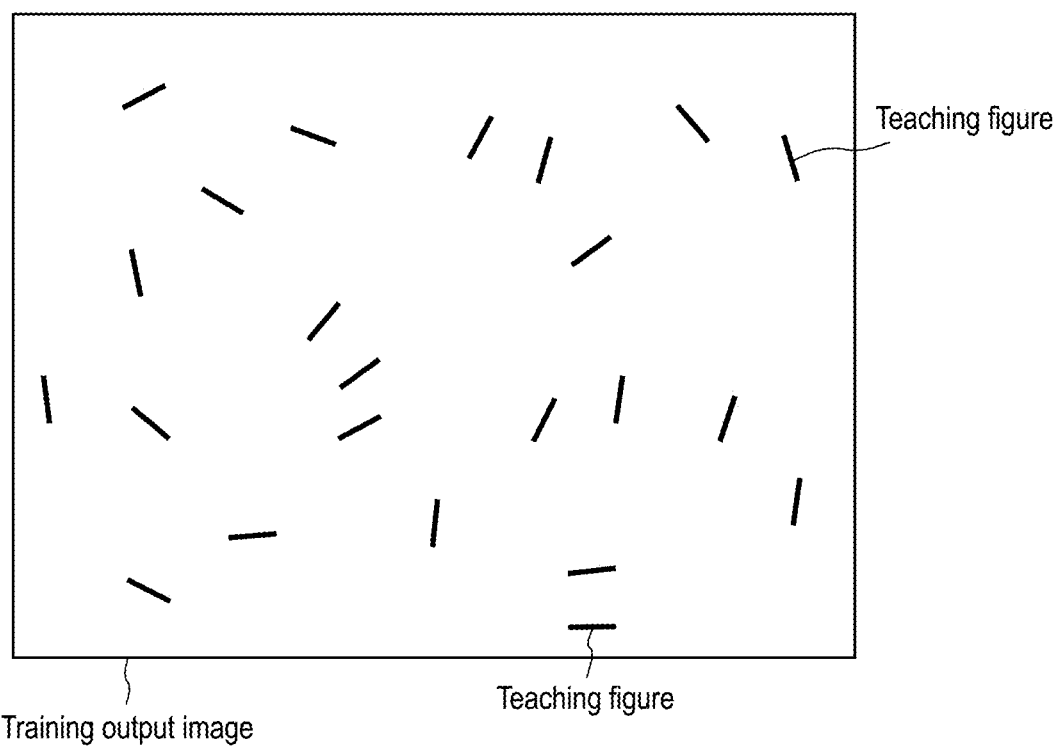
FIG. 7B is a diagram showing an example of a training output image according to the embodiment.
Figure 7C:
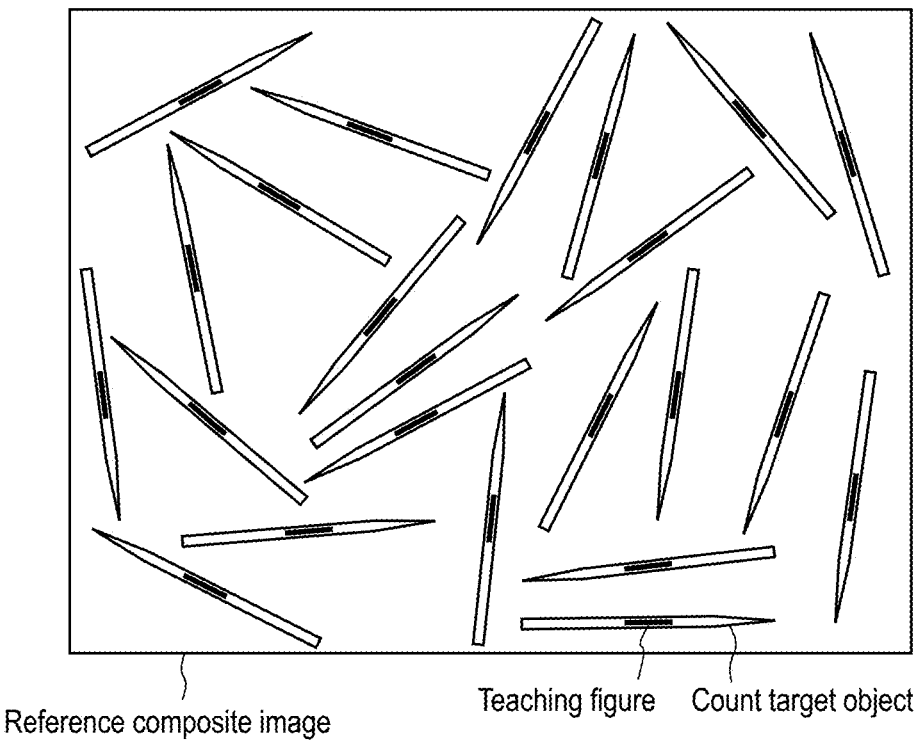
FIG. 7C is a diagram showing an example of a reference composite image according to the embodiment.

FIG. 7A is a training input image of count target objects that are toothpicks, and FIG. 7B is a training output image containing teaching figures with directionality (i.e., linear teaching figures) that are arranged at respective positions of the toothpicks in the training input image in FIG. 7A. FIG. 7C is a reference diagram obtained by compositing the training input image in FIG. 7A and the training output image in FIG. 7B. As shown in FIG. 7C, the teaching figures are arranged at the centers of the count target objects such that the directions thereof conform to those of the count target objects.

Figure 8A:
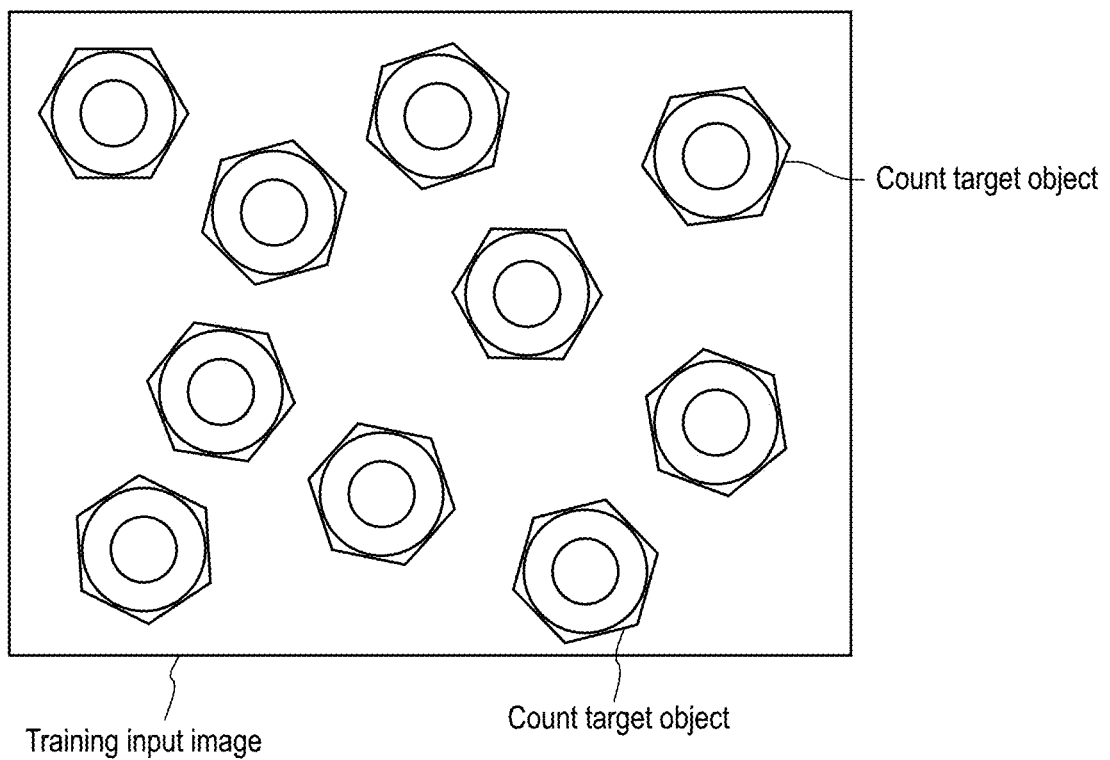
FIG. 8A is a diagram showing an example of a training input image according to the embodiment.
Figure 8B:
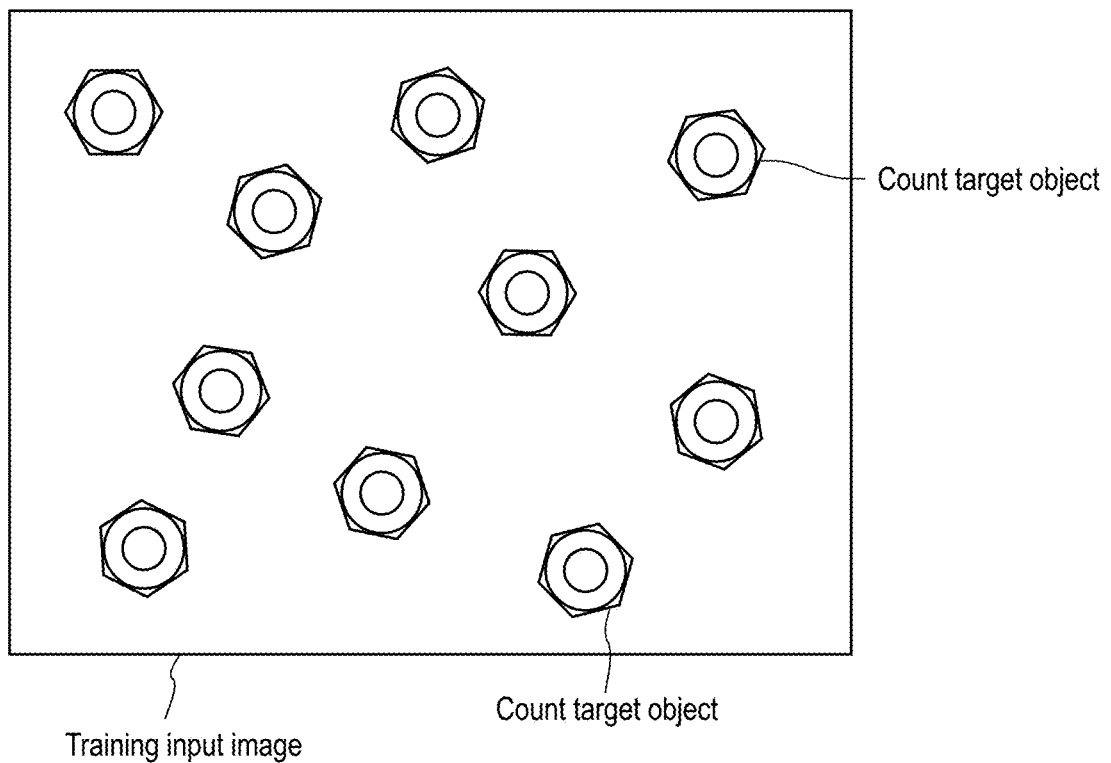
FIG. 8B is a diagram showing an example of a training input image according to the embodiment.
Figure 8C:
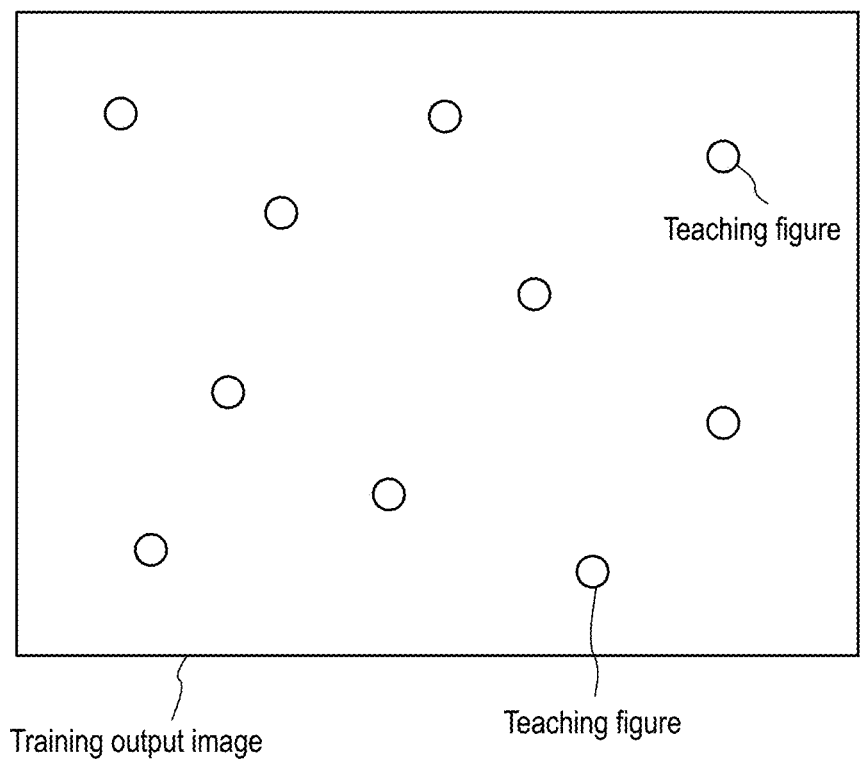
FIG. 8C is a diagram showing an example of a training output image according to the embodiment.
Figure 8D:
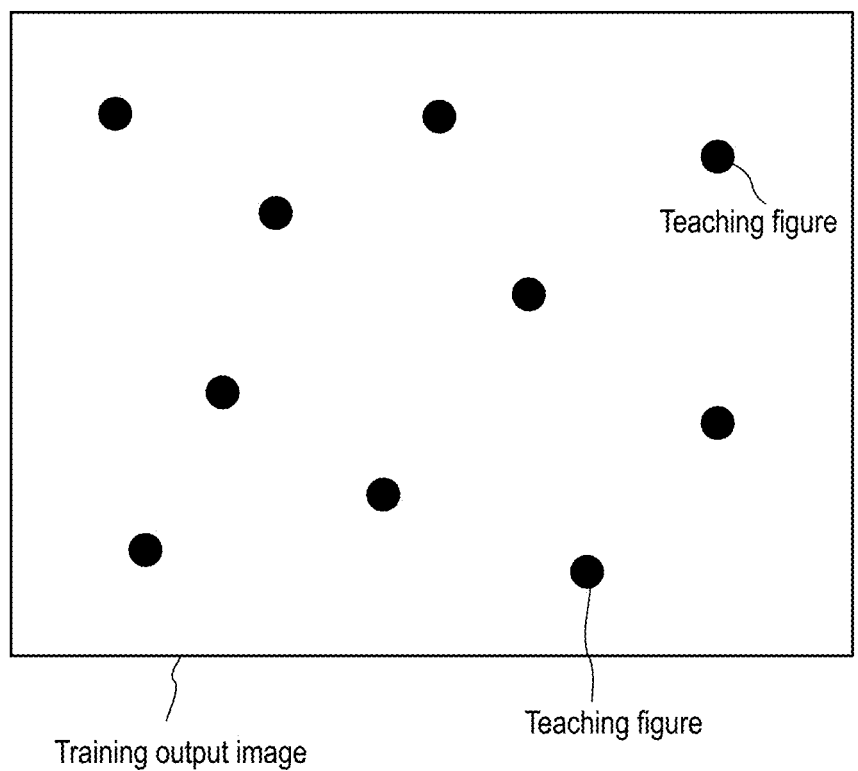
FIG. 8D is a diagram showing an example of a training output image according to the embodiment.
Figure 8E:
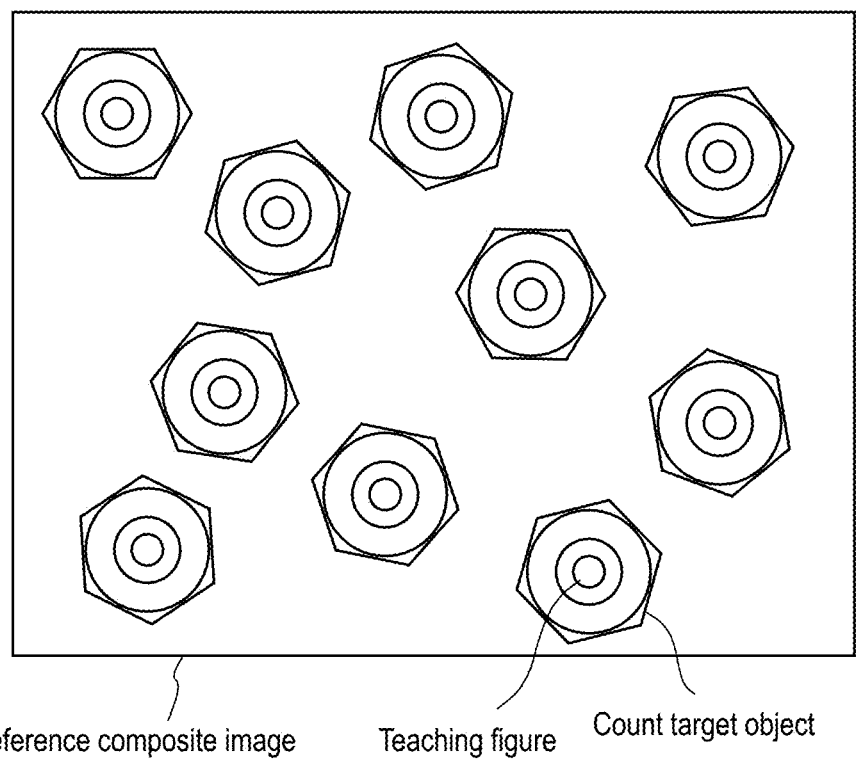
FIG. 8E is a diagram showing an example of a reference composite image according to the embodiment.
Figure 8F:
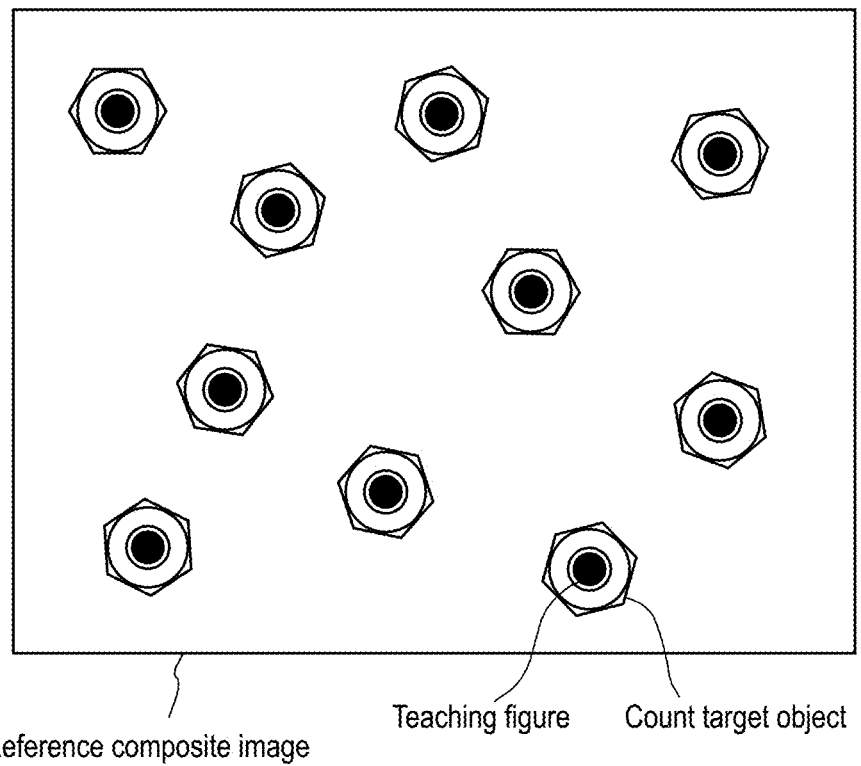
FIG. 8F is a diagram showing an example of a reference composite image according to the embodiment.

FIGS. 8A and 8B are training input images of count target objects that are nuts. It is assumed that the nuts in the training input image in FIG. 8A are larger than the nuts in the training input image in FIG. 8B. In this example, the nuts in FIG. 8A are referred to as "large nuts", and the nuts in FIG. 8B are referred to as "small nuts". FIG. 8C is a training output image containing teaching figures without directionality that are arranged at respective positions of the large nuts in the training input image in FIG. 8A, and FIG. 8D is a training output image containing teaching figures without directionality that are arranged at respective positions of the small nuts in the training input image in FIG. 8B. The teaching figures contained in the training output image in FIG. 8C are white figures, and the teaching figures contained in the training output image in FIG. 8D are black figures. In this manner, teaching figures with an attribute that is different (i.e., lightness that is different) for each of different sizes of count target objects are used. FIG. 8E is a reference diagram obtained by compositing the training input image in FIG. 8A and the training output image in FIG. 8C, and FIG. 8F is a reference diagram obtained by compositing the training input image in FIG. 8B and the training output image in FIG. 8D. As shown in FIGS. 8E and 8F, the teaching figures are arranged at the positions of holes of the nuts that are count target objects. In this manner, the state in which teaching figures are arranged at respective positions of count target objects may be a state in which teaching figures are arranged at positions that overlap count target objects as shown in FIG. 5C and the like, or a state in which teaching figures are arranged at positions that do not overlap count target objects as shown in FIG. 8E and the like.

Although FIGS. 5 to 8 each show one pair of a training input image and a training output image, typically, multiple pairs of training input images and training output images are used for learning. For example, if count target objects are soybeans, the training images shown in FIG. 5 and the like may be used, if count target objects are dried noodles, the training images shown in FIG. 6 and the like may be used, if count target objects are toothpicks, the training images shown in FIG. 7 and the like may be used, and, if count target objects are nuts, the training images shown in FIG. 8 and the like may be used. It is preferable that count target objects do not overlap each other in training images. The larger the number of pairs of training input images and training output images used for learning, the better, but the cost increases in order to prepare a larger number of pairs of training input images and training output images. Accordingly, it is preferable that the number of pairs of training input images and training output images for use in learning is set to the extent at which proper counting can be performed. For example, in the case of soybeans in FIG. 5, learning may be performed by preparing approximately 50 pairs of training input images and training output images using approximately 300 to 500 soybeans.

For example, the training image accepting unit 21 may receive information transmitted via a wired or wireless communication line, or accept information read from a predetermined storage medium (e.g., an optical disk, a magnetic disk, a semiconductor memory, etc.). The training image accepting unit 21 may or may not include a device for accepting information (e.g., a modem, a network card, etc.). The training image accepting unit 21 may be realized by hardware, or software such as a driver that drives a predetermined device.

The learning model producing unit 22 produces a learning model through learning of multiple pairs of training input images and training output images. This learning model is a result of machine learning of multiple pairs of training input images each obtained by capturing an image of count target objects, and training output images each containing multiple teaching figures that are arranged at respective positions of the count target objects contained in the training input images. Accordingly, for example, if a captured image of multiple count target objects is applied to the learning model, an output figure in which the count target objects contained in the captured image are converted into count target figures can be obtained. The count target figures are figures corresponding to teaching figures, and ideally have the same attributes (e.g., the shape, the size, the color, etc.) as teaching figures. At the time of learning, training input images and training output images may be used in a divided state. For example, it is possible that a divided image at a predetermined portion obtained by dividing a training input image is taken as input, and a divided image at a portion corresponding to the predetermined portion of the input, obtained by dividing a training output image is taken as output corresponding to the input. When dividing an image, there may or may not be overlapping portions (duplicate portions) in divided images. The learning will be described later in detail.

The learning model output unit 23 outputs the learning model produced by the learning model producing unit 22. The learning model output by the learning model output unit 23 is stored in the storage unit 11 of the counting apparatus 1 shown in FIG. 1. The output may be, for example, transmission via a communication line to a predetermined device, accumulation in a storage medium, or delivery to another constituent element. The learning model output unit 23 may or may not include a device that performs output (e.g., a communication device, etc.). The learning model output unit 23 may be realized by hardware, or software such as a driver that drives these devices.

Next, machine learning using the learning model producing unit 22 will be described. The machine learning is supervised learning, and may be learning of neural networks, learning of support vector machines or support vector regression, or other machine learning. In this example, a case will be mainly described in which machine learning is learning of a neural network.

The neural network that is a learning model is a neural network for performing image processing, and performs a predetermined operation on pixel values of an input image, thereby outputting pixel values of an output image. The neural network may have, for example, multiple convolutional layers (conv 1 to conv 4) in a stage behind the input layer as shown in FIG. 14A. FIG. 14A shows the configuration of layers from the input layer to the output layer (enlarging layer 4). Through machine learning, parameter values of filters of the multiple convolutional layers are calculated. The neural network may or may not have one or more pooling layers. There is no limitation on the number of successive convolutional layers contained in the neural network. For example, the neural network may have three or more successive convolutional layers, or five or more successive convolutional layers.

Furthermore, padding may be performed as appropriate in each layer of the neural network. The padding may be, for example, zero padding, padding that extrapolates pixel values at the outermost periphery of an image, or padding that sets pixel values turned back at each side of an image. FIG. 14A shows an example in which padding is performed, but it is also possible that padding is not performed.

Furthermore, there is no limitation on the stride in each layer, but, for example, it is preferable that the stride in a convolutional layer is a small value such as 1 or 2, and, if the neural network has a pooling layer, the stride in the pooling layer is 2 or more.

Figure 14B:
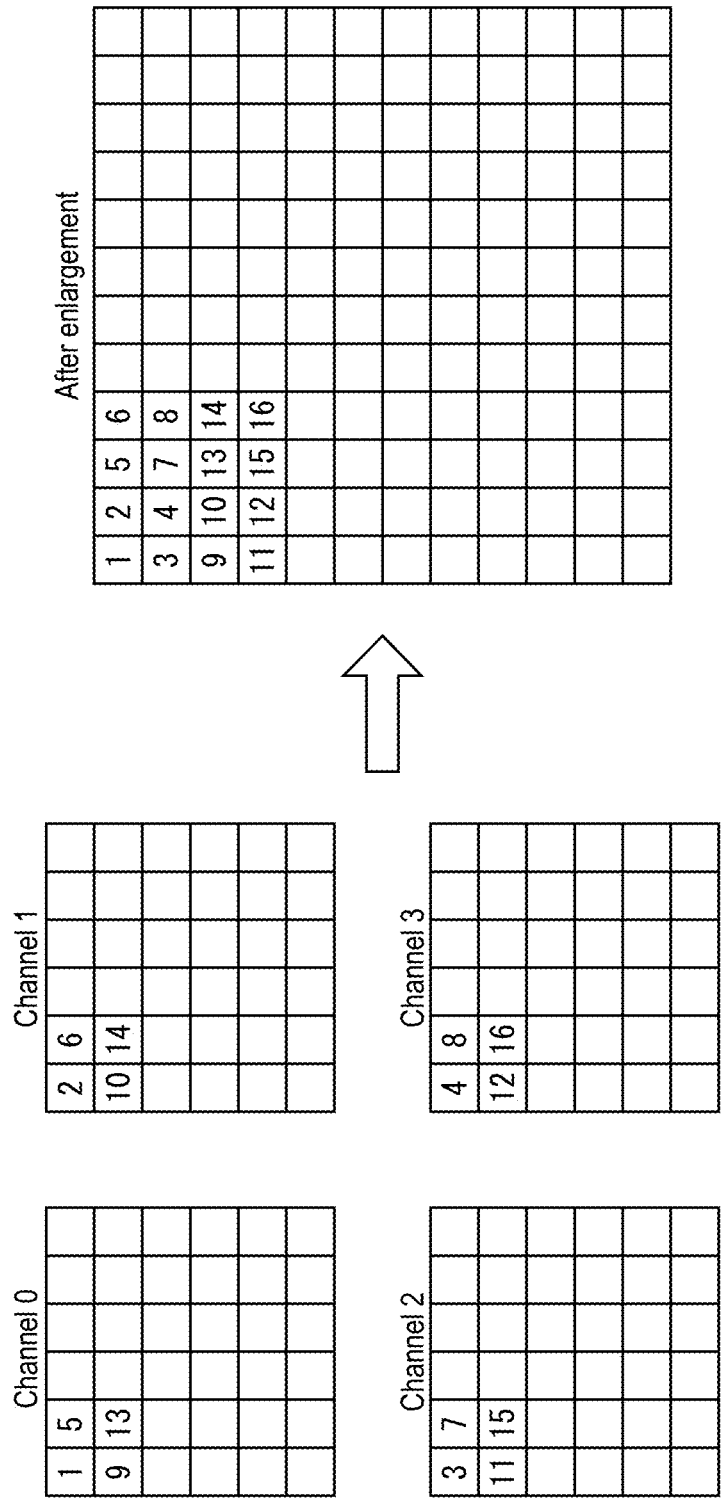
FIG. 14B is a diagram illustrating an enlarging layer in a neural network according to the embodiment.

In a convolutional layer with a stride of 2 or more, the image is reduced. Accordingly, when such a convolutional layer is used, an enlarging layer for enlarging an image may be provided in a stage behind the neural network. The enlarging layer is, for example, a layer through which an image with an input map size of $W \times W \times (C \cdot r^2)$ is output as an image with an output map size of $(r \cdot W) \times (r \cdot W) \times C$. The map size $W \times W \times K$ indicates that the number of pixels in the vertical and horizontal directions of an image is $W \times W$, and the number of channels is K. FIG. 14B is a diagram illustrating an enlarging layer in a case in which r=2. In FIG. 14B, for example, an input image with four channels is converted into an output image with one channel. At that time, 2×2 pixels 1 to 4 at the upper left corner of an enlarged output image are constituted by four pixels 1 to 4 at the $1^{-st}$ row from the top and the $1^{-st}$ column from the left of Channels 0 to 3. Also, four pixels 5 to 8 at the $1^{-st}$ and $2^{-nd}$ rows from the top and $3^{-rd}$ and $4^{-th}$ columns from the left of the enlarged output image are constituted by four pixels 5 to 8 at the 1-st row from the top and the $2^{-nd}$ column from the left of Channels 0 to 3. The same applies to the other pixels.

Generally, if a $W \times W \times r^2$ input image (input map) is converted into an $(r \cdot W) \times (r \cdot W) \times 1$ output image (output map) through an enlarging layer, a pixel (x, y) of the output image (output map) of the enlarging layer is a pixel (floor(x/r), floor(y/r)) with "mod(x, r)+r·mod(y, r)" channels of the input image (input map). Note that x indicates the horizontal position in the output image, y is the vertical position in the output image, mod(a, b) is the remainder of a by b, and floor is the floor function. It is assumed that the input image contains $r^2$ channels from Channel 0 to Channel $r^2-1$. Also, r is typically an integer of 2 or more. In the input image and the output image, a pixel at the upper left corner is taken as (0, 0) and a pixel that is shifted by i pixels in the right direction and j pixels in the lower direction from that pixel is taken as (i, j). If the number of channels in the input image is $C \cdot r^2$, the above-described enlargement is performed for each set of $r^2$ channels, so that an enlarged output image with C channels can be obtained. In this manner, this enlarging layer is a layer for obtaining an output image with one channel that has been vertically and horizontally multiplied by r, using an input image with $r^2$ channels, and an r×r block in the output image is constituted by $r^2$ pixels at the position corresponding to that block, in the input image with $r^2$ channels.

As shown in FIG. 14A, the neural network may or may not have a convolutional layer in a stage behind an enlarging layer. The neural network is preferably such that, due to one or more enlarging layers, an image of an output layer has the same size as an image of an input layer. FIG. 14A shows a case in which an image of an input layer is a color image with three channels, and an image of an output layer is a grayscale image with one channel, but there is no limitation to this. It is also possible that an image of an input layer is a grayscale image with one channel, or an image of an output layer is a color image with three channels.

The enlarging layer may be a layer other than that described above. Example of a layer of a neural network for outputting an image that is larger than an input image include an unpooling layer and a deconvolution layer. FIG. 14A shows a case in which multiple convolutional layers are provided in an earlier stage, and one or more enlarging layers are provided in a later stage, but the neural network may have other configurations.

Furthermore, a bias may or may not be used in each layer. Whether or not a bias is used may be independently determined for each layer. The bias may be, for example, a bias for each layer, or a bias for each filter. In the case of the former, one bias is used in each layer, and, in the case of the latter, one or more (the same number as filters) biases are used in each layer. When a bias is used in a convolutional layer, a value obtained by multiplying pixel values by a filter parameter, summing up the products, and adding a bias to the sum is input to an activation function.

As a learning result of a neural network that is a learning model in this embodiment, for example, a learning result of a neural network for use in segmentation may be used. That is to say, it is also possible that learning is performed using those for segmentation as neural network structures, and those described in this embodiment as training images.

The settings in the neural network may be as follows. The activation function may be, for example, an ReLU (rectified linear unit), a sigmoid function, or other activation functions. In the learning, for example, a backpropagation method or a mini-batch method may be used. The loss function (error function) may be a mean square error. There is no particular limitation on the number of epochs (the number of times that a parameter is updated), but the number of epochs is preferably selected so as not to cause overfitting. The learning method of machine learning may be known methods, and thus a detailed description thereof has been omitted.

Returning to FIG. 1, the captured image acquiring unit 12 acquires a captured image of multiple count target objects with the same shape. The captured image is typically an image of a mass of count target objects. If the multiple count target objects contained in a training input image have the same size, it is preferable that, in the captured image, the sizes of the multiple count target objects are the same as the sizes of the multiple count target objects contained in the training input image. If the multiple count target objects contained in a training input image do not have the same size, it is preferable that, in the captured image, the sizes of the multiple count target objects are within the range of the sizes of the multiple count target objects contained in the training input image. In order to set the sizes of the multiple count target objects in the captured image to be the same as the sizes of the multiple count target objects in the training input image, it is preferable to capture an image such that the settings (e.g., the focal distance, etc.) of optical systems, the number of pixels, the distance to the count target objects, and the like are the same as those when the training input image was captured. For example, if the training input image is a color image, it is preferable that the captured image is also a color image, and, if the training input image is a grayscale image, it is preferable that the captured image is also a grayscale image. The captured images are typically still images, but frames contained in a moving image may be considered as captured images. Strictly speaking, those contained in captured images and training input images are images of count target objects, but it will be described that captured images and training input images contain count target objects, for the sake of convenience.

For example, the captured image acquiring unit 12 may acquire a captured image using an optical device such as a camera, or accept a captured image acquired by an optical device such as a camera. If the captured image acquiring unit 12 accepts a captured image, the captured image may be accepted by receiving a captured image transmitted via a communication line, or reading a captured image from a predetermined storage medium (e.g., an optical disk, a magnetic disk, a semiconductor memory, etc.). The captured image acquiring unit 12 may accumulate the acquired captured image in an unshown storage medium.

The output image acquiring unit 13 acquires an output image in which the count target objects contained in the captured image acquired by the captured image acquiring unit 12 are converted into count target figures, by applying the captured image to a learning model stored in the storage unit 11. Specifically, the output image acquiring unit 13 can acquire an output image that is output of a learning model, by inputting each pixel value of a captured image acquired by the captured image acquiring unit 12 to the learning model. If a function, a model, or the like that is a learning model is stored in the storage unit 11, the output image acquiring unit 13 may acquire an output image, by performing an operation on a captured image using the function, the model, or the like. The count target figures are figures corresponding to count target objects, and ideally have the same shape and the same color as teaching figures, but may actually have a shape or a color different from that of teaching figures.

If a captured image contains multiple types of count target objects, and counting is performed for each type thereof, it is preferable that a learning model to which the captured image is applied are trained using teaching figures with an attribute that is different for each type of the count target objects. For example, if the type of count target objects is the size of the count target objects, it is preferable to apply a captured image to a learning model trained using teaching figures with an attribute that is different for each size of the count target objects.

When inputting a captured image to a learning model, the output image acquiring unit 13 may divide the captured image, and input a divided image obtained by the dividing. If learning is performed using a divided image of a training input image or a training output image, a divided image of a captured image may be used to obtain an output image from the captured image. When inputting a divided image, output from the learning model is also a divided image, and thus the output image acquiring unit 13 may acquire one output image, by connecting output divided images. When dividing or connecting images, there may or may not be overlapping portions (duplicate portions) in divided images. The method for dividing an image and applying the divided images to a learning model is known, and thus a detailed description thereof has been omitted.

FIGS. 10 to 13 are diagrams showing examples of a captured image, an output image, and a reference composite image obtained by compositing these images. FIG. 10A is a captured image of count target objects that are soybeans, and FIG. 10B is an output image obtained by applying the captured image in FIG. 10A, to a learning model trained using training images regarding soybeans. FIG. 10C is a reference diagram obtained by compositing the captured image in FIG. 10A and the output image in FIG. 10B. As shown in FIG. 10C, it is seen that the count target figures are located at the centers of the count target objects contained in the captured image. Even when count target objects partially overlap each other, it is possible to obtain output containing proper count target figures.

Figure 11A:
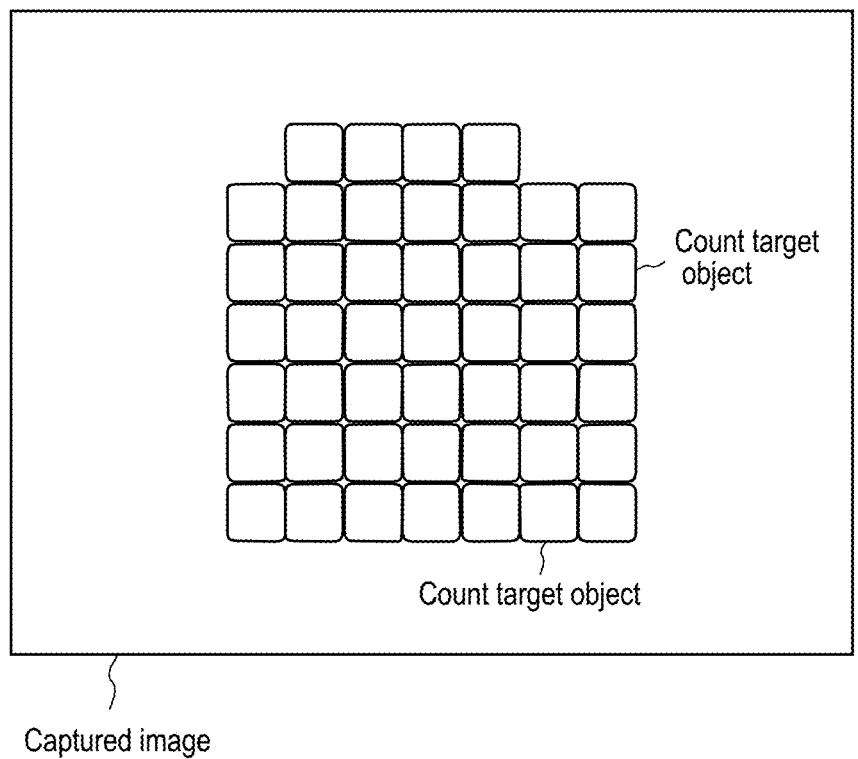
FIG. 11A is a diagram showing an example of a captured image according to the embodiment.
Figure 11B:
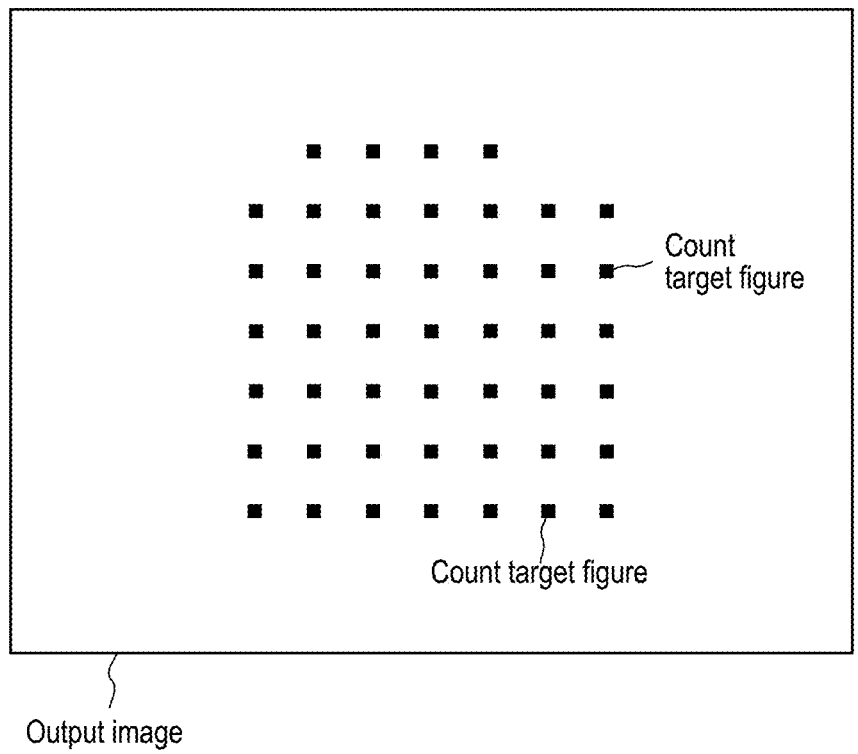
FIG. 11B is a diagram showing an example of an output image according to the embodiment.
Figure 11C:
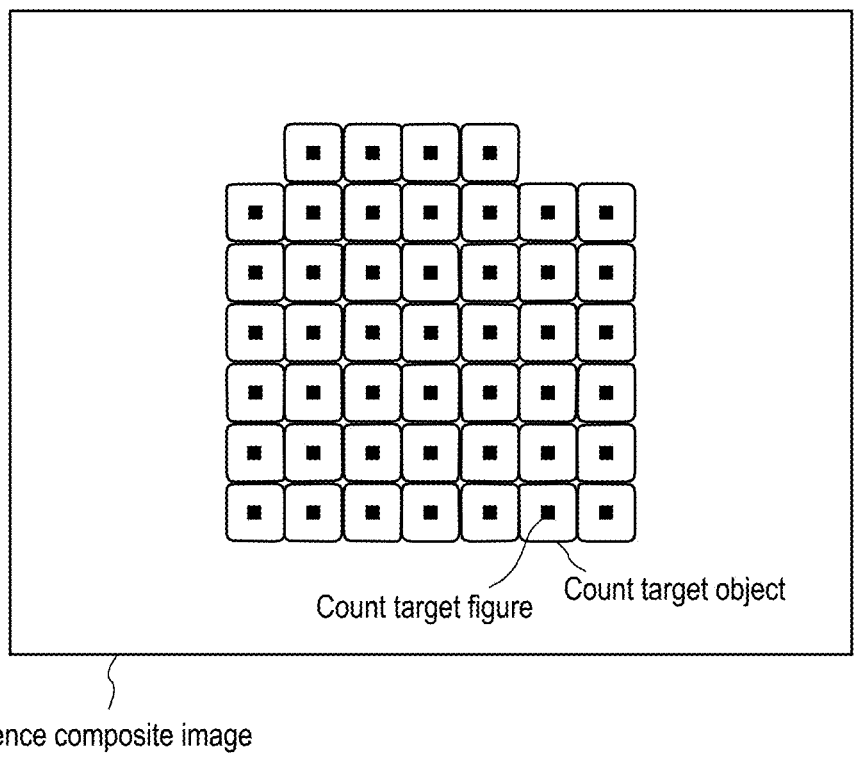
FIG. 11C is a diagram showing an example of a reference composite image according to the embodiment.

FIG. 11A is a captured image of end portions of count target objects that are multiple pieces of linear dried noodles in a state of being stacked one on top of another, and FIG. 11B is an output image obtained by applying the captured image in FIG. 11A, to a learning model trained using training images regarding dried noodles. FIG. 11C is a reference diagram obtained by compositing the captured image in FIG. 11A and the output image in FIG. 11B. As shown in FIG. 11C, it is seen that the count target figures are located at the centers of the count target objects contained in the captured image. In this case, learning using teaching figures with directionality is performed, and thus the count target figures contained in the output image are also located such that the orientations thereof conform to those of the count target objects.

Figure 12A:
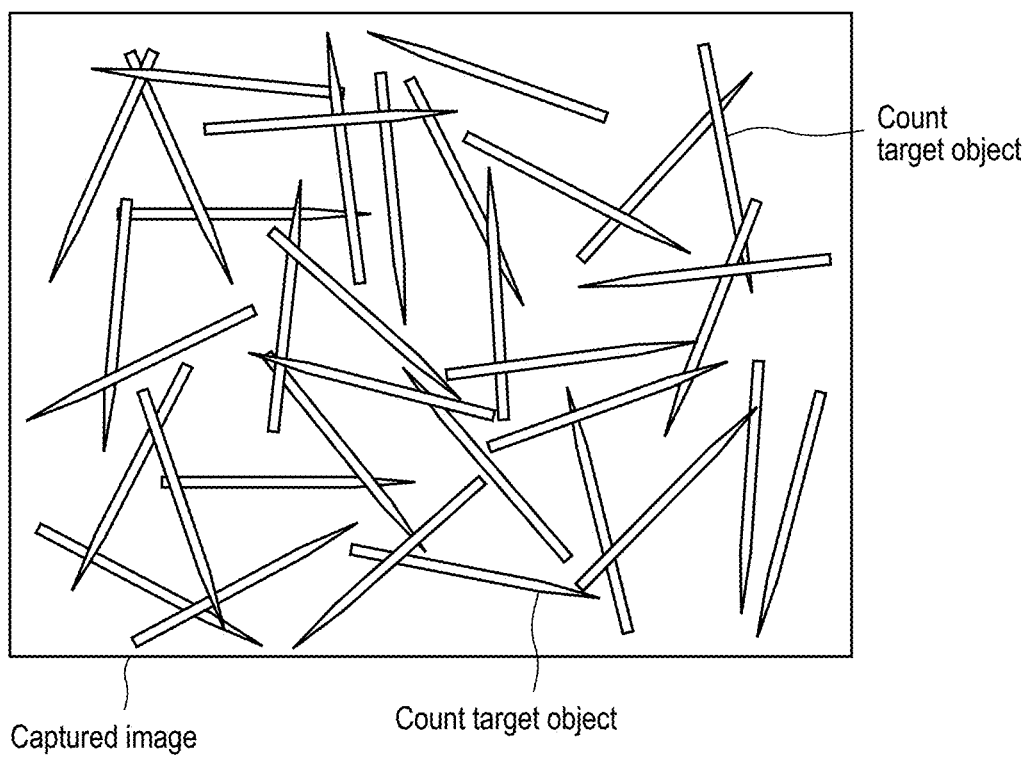
FIG. 12A is a diagram showing an example of a captured image according to the embodiment.
Figure 12B:
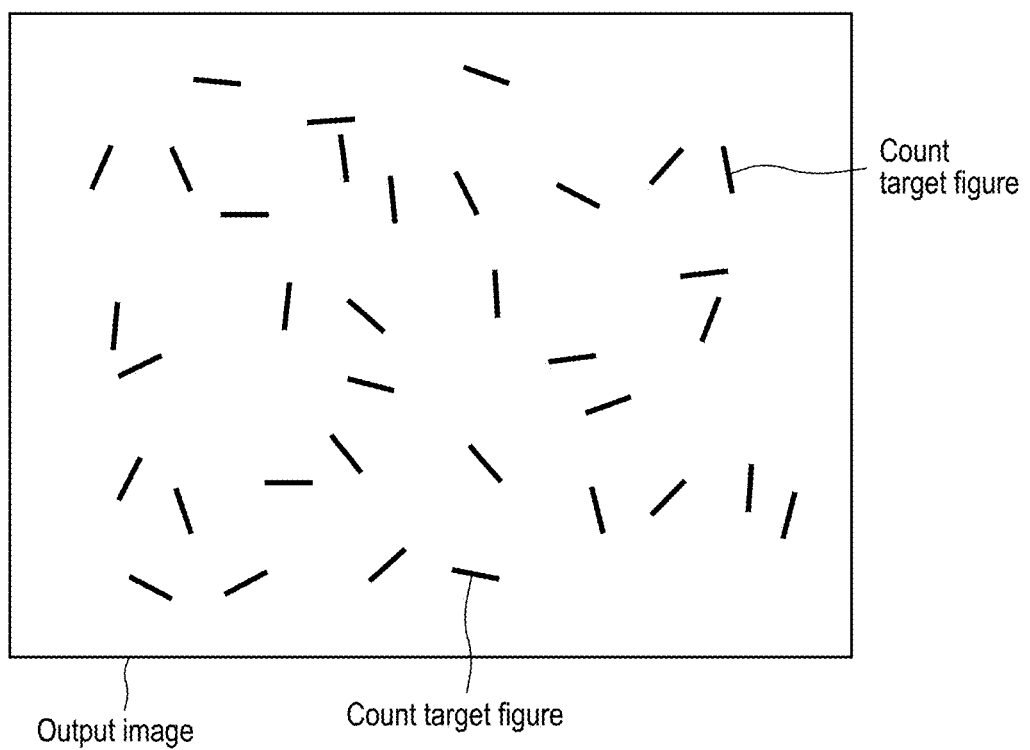
FIG. 12B is a diagram showing an example of an output image according to the embodiment.
Figure 12C:
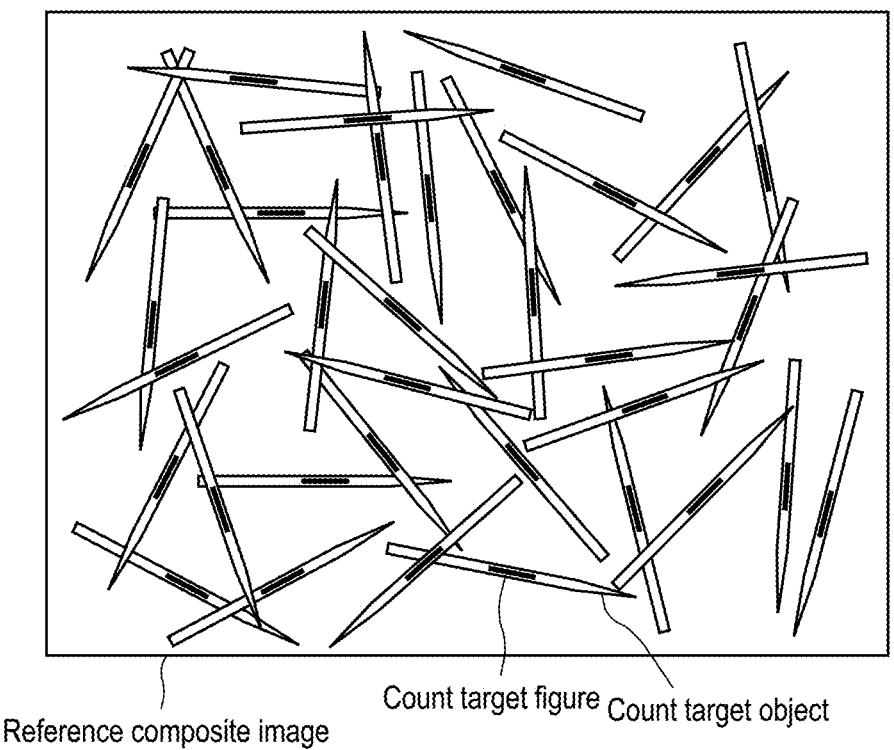
FIG. 12C is a diagram showing an example of a reference composite image according to the embodiment.

FIG. 12A is a captured image of count target objects that are toothpicks, and FIG. 12B is an output image obtained by applying the captured image in FIG. 12A, to a learning model trained using training images regarding toothpicks. FIG. 12C is a reference diagram obtained by compositing the captured image in FIG. 12A and the output image in FIG. 12B. As shown in FIG. 12C, it is seen that the count target figures are located at the centers of the count target objects contained in the captured image. In this case, learning using teaching figures with directionality is performed, and thus the count target figures contained in the output image are also located such that directions thereof conform to those of the toothpicks that are count target objects.

Figure 13A:
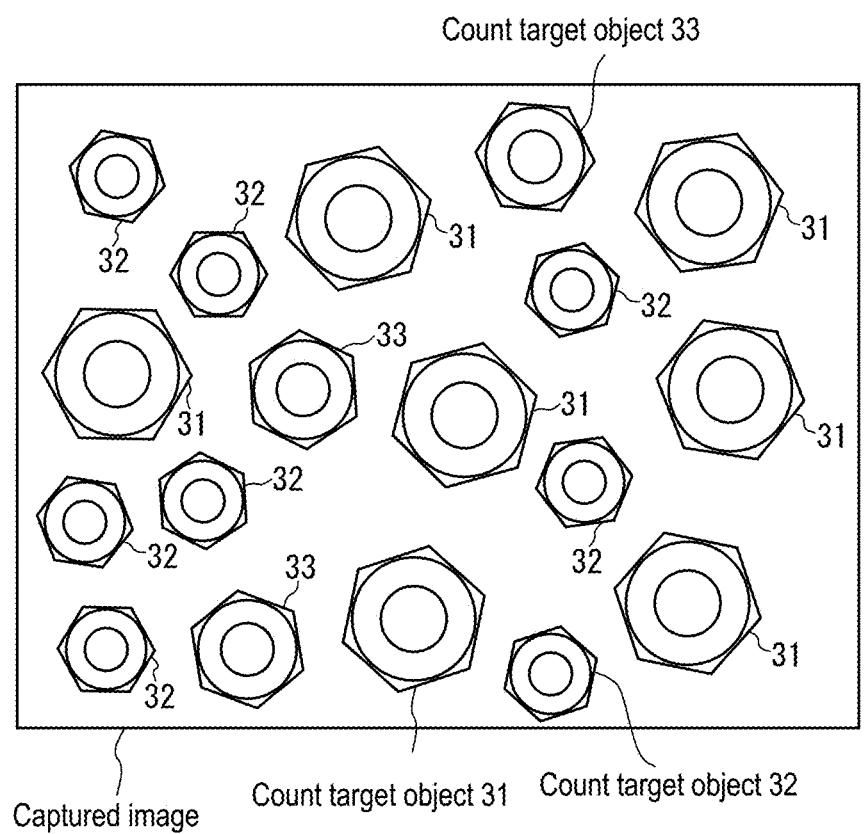
FIG. 13A is a diagram showing an example of a captured image according to the embodiment.
Figure 13B:
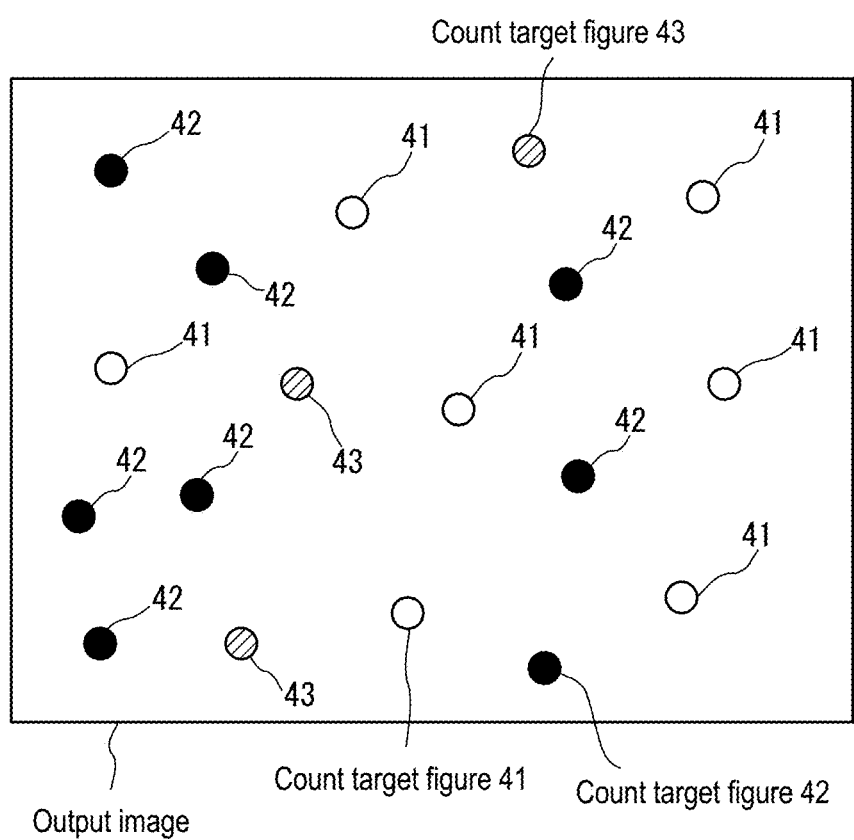
FIG. 13B is a diagram showing an example of an output image according to the embodiment.
Figure 13C:
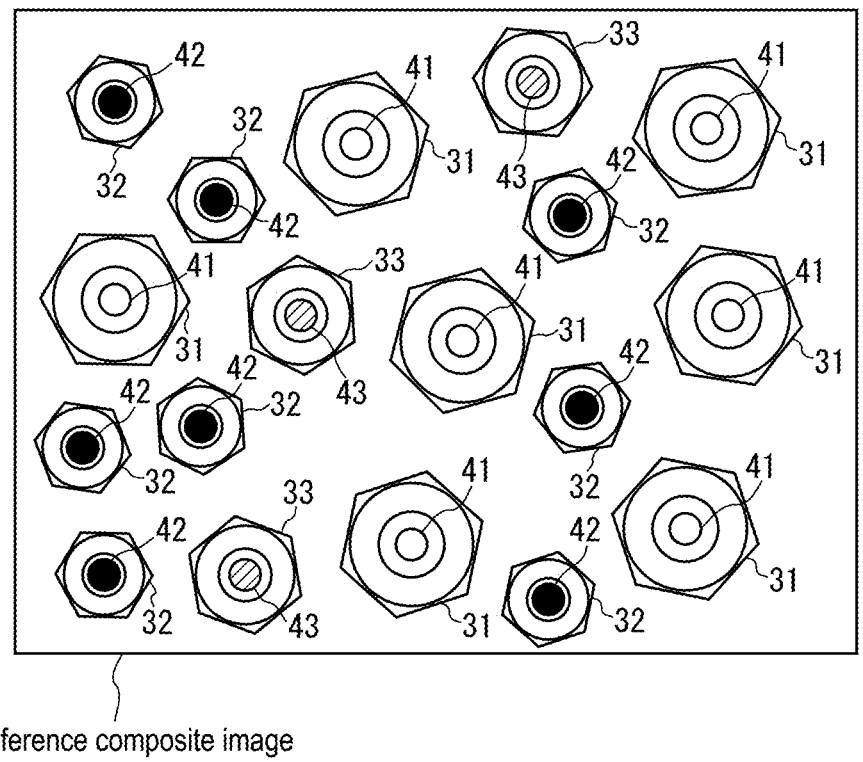
FIG. 13C is a diagram showing an example of a reference composite image according to the embodiment.

FIG. 13A is a captured image of count target objects 31 that are large nuts, count target objects 32 that are small nuts, and count target objects 33 that are nuts with a size that is between those of the large nuts and the small nuts (hereinafter, referred to as "medium nuts"), and FIG. 13B is an output image obtained by applying the captured image in FIG. 13A, to a learning model trained using training images regarding nuts. The output image in FIG. 13B contains count target figures 41 corresponding to the large nuts, count target figures 42 corresponding to the small nuts, and count target figures 43 corresponding to the medium nuts. It is assumed that the attribute of the count target figures 41 corresponds to the large nuts, the attribute of the count target figures 42 corresponds to the small nuts, and the attribute of the count target figures 43 is close to the middle between the attribute of the count target figures 41 and the attribute of the count target figures 42. FIG. 13C is a reference diagram obtained by compositing the captured image in FIG. 13A and the output image in FIG. 13B. As shown in FIG. 13C, the count target figures 41 are located at the centers of the count target objects 31 contained in the captured image, the count target figures 42 are located at the centers of the count target objects 32, and the count target figures 43 are located at the centers of the count target objects 33.

The confidence level acquiring unit 14 acquires, for each count target figure contained in the output image, a confidence level that increases in accordance with an attribute of the count target figure being closer to an attribute of a teaching figure, and decreases in accordance with an attribute of the count target figure being farther from an attribute of a teaching figure. The attribute may be a color or a shape as described above, or other attributes (e.g., a size, an angle, etc.). The confidence level is a value indicating the level of confidence regarding conversion from count target objects to count target figures. If ideal conversion is performed, count target figures are the same as teaching figures. For example, FIGS. 10 to 13 show a case in which ideal conversion is performed. However, actually, there are cases in which count target objects are converted into count target figures that are different from teaching figures, and thus a confidence level of count target figures is acquired according to a difference between the count target figures and teaching figures. Accordingly, it may be considered that the higher the confidence level, the more ideal the conversion performed from count target objects to count target figures.

In order to acquire a confidence level, it is necessary to specify count target figures contained in an output image. For example, the count target figures may be specified by using a result of specification performed by the counting unit 15, or may be specified by the confidence level acquiring unit 14 separately from specification performed by the counting unit 15.

Furthermore, the value that is acquired may be, for example, an unconfidence level (e.g., an inverse number of the confidence level, etc.), as long as the confidence level can be eventually acquired. The reason for this is that, also in that case, it is possible to eventually see the confidence level using the unconfidence level.

Hereinafter, the method for acquiring a confidence level will be described by way of some examples. The confidence level may be acquired, for example, using (1) shape, (2) size, (3) color attribute, or (4) angle.

(1) Acquisition of Confidence Level Using Shape

Figure 9:
FIG. 9 is a diagram showing an example of correspondence between count target figures and confidence levels according to the embodiment.
Figure 9:
Figure 9:
Figure 9:
Figure 9:

In this case, it is assumed that the shape of the teaching figures is predetermined. A confidence level is acquired that decreases in accordance with the shape of the count target figures being farther from the shape of the teaching figures, and increases in accordance with the shape of the count target figures being closer to the shape of the teaching figures. For example, it is assumed that, as shown in FIG. 9, a teaching figure has a disc-like shape, and count target FIG. 1 to 4 have shapes that are slightly different from the disc-like shape. If the shape of the count target FIG. 1 is close to that of the teaching figure, and the difference between the shape of the count target FIGS. 2 to 4 and that of the teaching figure increases in this order, for example, a confidence level of 95% is acquired for the count target FIG. 1, and confidence levels of 85%, 75%, and 65% are respectively acquired for the count target FIGS. 2 to 4. In this case, it is also possible that the level at which the shape of the count target figures deviates from the shape of the teaching figure is acquired, and the deviation level is converted into the confidence level. The deviation level may be, for example, the contour shape of the count target figures deviates from the contour shape of the teaching figure. More specifically, the confidence level acquiring unit 14 may place a count target figure for which a confidence level is to be acquired, in the most fittable manner, on the teaching figure, acquire distances from contour points constituting the contour of the count target figure to the contour of the teaching figure, and add the acquired distances from the contour points, thereby acquiring the deviation level. The distance may be a distance from a contour point of the count target figure to the closest point on the contour of the teaching figure. The confidence level may be acquired by substituting a value indicating the acquired deviation level for a decreasing function.

(2) Acquisition of Confidence Level Using Size

In this case, it is assumed that the size of the teaching figures is predetermined. A confidence level is acquired that decreases in accordance with the size of the count target figures being farther from the size of the teaching figures, and increases in accordance with the size of the count target figures being closer to the size of the teaching figures.

The size may be, for example, an area. In this case, the confidence level acquiring unit 14 may acquire an area of a count target figure for which a confidence level is to be acquired, and acquire an absolute value of a difference between the acquired area and the area of the teaching figure held in advance. Since the acquired absolute value is a value indicating the deviation level at which the count target figure for which a confidence level is to be acquired deviates from the teaching figure, the confidence level may be acquired by substituting the value indicating the deviation level for a decreasing function, in a similar way to that of (1) described above.

Furthermore, if the teaching figure has a circular shape or a disc-like shape, the size may be, for example, a radius or a diameter. In that case, the confidence level acquiring unit 14 may acquire a radius or a diameter of a count target figure for which a confidence level is to be acquired, and acquire an absolute value of a difference between the acquired radius or diameter and the radius or diameter of the teaching figure held in advance, thereby acquiring a value indicating the deviation level at which the count target figure for which a confidence level is to be acquired deviates from the teaching figure. Subsequently, the confidence level may be acquired as described above.

(3) Acquisition of Confidence Level Using Color Attribute

In this case, it is assumed that the color attribute of the teaching figures is predetermined. The color attribute of the teaching figures may be, for example, constant. Specifically, the lightness, the hue, or the like of the teaching figures may be set so as to be constant.

In this case, for example, the confidence level acquiring unit 14 may acquire color attributes of pixels constituting a count target figure for which a confidence level is to be acquired, acquire absolute values of differences between the acquired color attributes and the color attribute of the teaching figure, and add the absolute values of the acquired color attributes of the pixels. Since the result of the addition is a value indicating the deviation level at which the color attribute of the count target figure for which a confidence level is to be acquired deviates from that of the teaching figure, the confidence level may be acquired by substituting the value indicating the deviation level for a decreasing function, in a similar way to that of (1) described above. Examples of the color attribute include any one or more of the lightness, the hue, and the saturation.

Furthermore, for example, the confidence level acquiring unit 14 may acquire color attributes of pixels constituting a count target figure for which a confidence level is to be acquired, and acquire an absolute value of a difference between an average of the acquired color attributes and the color attribute of the teaching figure. In that case, the acquired value may be a value indicating the deviation level at which the color attribute of the count target figure for which a confidence level is to be acquired deviates from that of the teaching figure.

Furthermore, for example, the confidence level acquiring unit 14 may acquire color attributes of pixels constituting a count target figure for which a confidence level is to be acquired, and calculate a variance of the acquired color attributes. The variance is ideally (i.e., in the teaching figure) 0, that is, the larger the variance, the more the color attribute of the count target figure deviates from the color attribute of the teaching figure. Accordingly, since the value of the variance is a value indicating the deviation level at which the color attribute of the count target figure for which a confidence level is to be acquired deviates from that of the teaching figure, the confidence level may be acquired by substituting the value indicating the deviation level for a decreasing function, in a similar way to that of (1) described above.

(4) Acquisition of Confidence Level Using Angle

In this case, it is assumed that the count target objects have shapes with directionality and conform to a certain direction, and the teaching figures with directionality are arranged so as to be along the direction of the count target objects. For example, FIG. 11 shows a state with such settings. In this case, for example, the confidence level acquiring unit 14 may acquire an angle of a count target figure for which a confidence level is to be acquired, and acquire an absolute value of a difference between the acquired angle and the angle of the teaching figure. Since the absolute value is a value indicating the deviation level at which the angle of the count target figure for which a confidence level is to be acquired deviates from that of the teaching figure, the confidence level may be acquired by substituting the value indicating the deviation level for a decreasing function, in a similar way to that of (1) described above. The angle of the teaching figure or the count target figures may be, for example, an angle of a side if the teaching figure or the count target figures has a square shape or a rectangular shape.

In the description above, the cases were described in which a decreasing function is used to acquire a confidence level from a deviation level at which a count target figure for which a confidence level is to be acquired deviates from a teaching figure, but there is no limitation to this. For example, it is also possible to acquire a confidence level, using information such as a table in which the deviation level, at which the count target figure for which a confidence level is to be acquired deviates from the teaching figure, is associated with the confidence level. It is also possible to perform normalization as appropriate such that the confidence level is a value within a predetermined range, such as 0 to 100%, or 0 to 1.

The counting unit 15 counts the number of count target objects, using multiple count target figures contained in the output image and confidence levels. Specifically, the counting unit 15 may count the number of count target figures with a confidence level that is greater than a threshold. The threshold is typically predetermined. The threshold may be adjusted as appropriate, for example, by an operator comparing a captured image and a counting result. The counting unit 15 may specify count target figures, by performing pattern matching in an output image using the shape of the teaching figure held in advance, and perform counting of the specified count target figures, using the confidence levels. It can be considered that a count target figure with a low confidence level is a result of an object that is not a count target object being converted. Accordingly, if count target figures with a low confidence level are prevented from being counted as described above, it is possible to prevent erroneous counting, and to eventually improve the level of accuracy in counting.

Furthermore, in the case of counting multiple types of count target objects, the counting unit 15 may perform counting for each group of count target figures with a specific attribute, in an output image. For example, if red teaching figures are used for soybeans and blue teaching figures are used for grains of rice in training images, the counting unit 15 may perform each of counting of red count target figures and counting of blue count target figures in an output image. More specifically, in an output image, the counting unit 15 specifies count target figures with an attribute corresponding to a type of count target objects, and perform counting of the count target objects of that type using the specified count target figures and the confidence levels of the count target figures. It is possible to perform counting of count target objects of all types, by performing such processing for each type of count target objects. In this case, for example, the confidence level acquiring unit 14 may acquire, for a count target figure with an attribute corresponding to a type of count target objects, a confidence level regarding that type, and acquire, for a count target figure with an attribute corresponding to another type, a confidence level regarding that type.

Furthermore, in the case of counting multiple types of count target objects, the confidence level acquiring unit 14 may acquire confidence levels of all count target figures contained in an output image, for each type of count target objects. For example, if an output image contains count target figures corresponding to soybeans and count target figures corresponding to grains of rice, the confidence level acquiring unit 14 may acquire, for all count target figures contained in the output image, confidence levels regarding soybeans and confidence levels regarding grains of rice. When acquiring the confidence levels, a difference between the attribute of the teaching figures of soybeans and the attribute of the teaching figures of grains of rice is preferably reflected in the confidence levels. For example, if the teaching figures of soybeans are red and the teaching figures of grains of rice are blue, it is preferable to acquire the confidence levels, using hues of the count target figures. The counting unit 15 may count soybeans, using the confidence level of soybeans for each count target figure contained in the output image, and count grains of rice, using the confidence level of grains of rice for each count target figure contained in the output image. In this manner, it is also possible to perform counting for each type of count target objects.

Furthermore, the counting unit 15 may also count the number of count target objects with a size for which learning has not been performed, by using attributes and confidence levels of count target figures contained in the output image. In this case, it is preferable that the sizes of count target objects with sizes for which learning has not been performed conform to each other. For example, an output image acquired by applying a captured image as shown in FIG. 13A containing medium nuts for which learning has not been performed, as well as large nuts and small nuts for which learning has been performed, to a learning model contains count target figures 43 corresponding to the medium nuts as well, as shown in FIG. 13B. In this case, typically, the count target figures 43 have a low confidence level regarding the large nuts and a low confidence level regarding the small nuts, and are not counted either as the large nuts or the small nuts. Meanwhile, if it is known that a captured image contains medium nuts, an intermediate attribute that is between the attribute of the teaching figures of large nuts and the attribute of the teaching figures of small nuts may be set as an attribute of virtual teaching figures of the medium nuts. The confidence level acquiring unit 14 may calculate, for the count target figures contained in the output image, confidence levels regarding the medium nuts, using the attribute of virtual teaching figures of the medium nuts. Subsequently, the counting unit 15 may count the medium nuts as well, using the confidence levels of the medium nuts, in a similar way to that of the large nuts and the small nuts. For example, assuming that the confidence levels regarding the medium nuts of three count target figures 43 are greater than a threshold in the output image shown in FIG. 13B, the counting unit 15 acquires "3" as the number of medium nuts. The counting unit 15 may count the number of count target figures that were not judged either as the large nuts or the small nuts using the confidence levels, as the number of medium nuts. The counting unit 15 may count the number of count target figures with a confidence level of the large nuts that is within a predetermined range and with a confidence level of the small nuts that is within a predetermined range, as the number of medium nuts.

The output unit 16 outputs the number of count target objects counted by the counting unit 15. If counting is performed for each type of count target objects, it is preferable that the number of objects is output for each type. The output may be, for example, display on a display device (e.g., a liquid crystal display, an organic EL display, etc.), transmission via a communication line to a predetermined device, printing by a printer, sound output by a speaker, accumulation in a storage medium, or delivery to another constituent element. The output unit 16 may or may not include a device that performs output (e.g., a display device, a printer, etc.). The output unit 16 may be realized by hardware, or software such as a driver that drives these devices.

Next, an operation of the counting apparatus 1 will be described with reference to the flowchart in FIG. 3.

(Step S101) The captured image acquiring unit 12 judges whether or not to acquire a captured image. If it is to acquire a captured image, the procedure advances to step S102, and, if otherwise, the processing in step S101 is repeated until it is judged to acquire a captured image. For example, the captured image acquiring unit 12 may judges to acquire a captured image, according to an instruction from an operator.

(Step S102) The captured image acquiring unit 12 acquires a captured image of count target objects. The acquire captured image may be stored in an unshown storage medium.

(Step S103) The output image acquiring unit 13 acquires an output image corresponding to the captured image acquired in step S102, by applying the captured image to a learning model stored in the storage unit 11. The acquired output image may be stored in an unshown storage medium.

(Step S104) The counting unit 15 specifies count target figures in the output image. The count target figures may be specified, for example, by specifying positions or regions containing the count target figures in the output image.

(Step S105) The confidence level acquiring unit 14 acquires a confidence level of each count target figure specified in step S104. In the case of counting multiple types of count target objects, for example, the confidence level acquiring unit 14 may acquire confidence levels of all specified count target figures, for each teaching figure corresponding to a type of count target objects. That is to say, if there are two types of count target objects, two confidence levels may be acquired for one count target figure.

(Step S106) The counting unit 15 acquires the number of count target figures, that is, the number of count target objects, using the count target figures specified in the output image and the confidence levels acquired by the confidence level acquiring unit 14. If multiple types of count target objects are contained in the captured image, the counting unit 15 may acquire the number of count target objects, for each type.

(Step S107) The output unit 16 outputs the number of count target objects acquired by the counting unit 15. The procedure returns to step S101.

Figure 3:
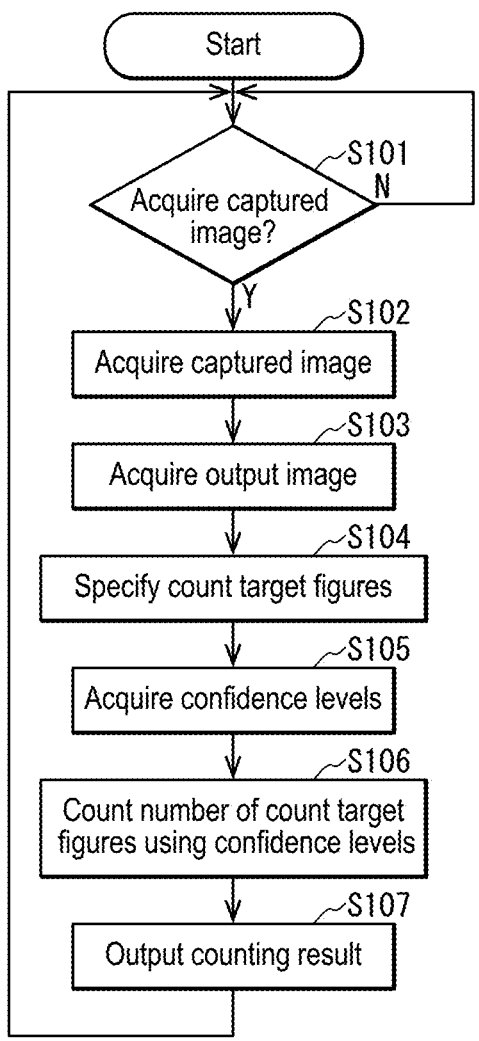
FIG. 3 is a flowchart showing an operation of the counting apparatus according to the embodiment.

The flowchart in FIG. 3 showed the case in which the confidence level acquiring unit 14 acquires a confidence level, for each count target figure specified by the counting unit 15, but there is no limitation to this. The confidence level acquiring unit 14 may also specify count target figures in an output image. The processing order in the flowchart in FIG. 3 is merely an example, and the order of the steps may be changed, as long as similar results can be obtained. In the flowchart in FIG. 3, the processing ends at power off or at an interruption of ending processing.

Next, an operation of the learning model producing apparatus 2 will be described with reference to the flowchart in FIG. 4.

(Step S201) The training image accepting unit 21 judges whether or not it has accepted multiple pairs of training input images and training output images. If it has accepted multiple pairs of training input images and training output images, the procedure advances to step S202, and, if otherwise, the processing in step S201 is repeated until it accepts multiple pairs of training images.

(Step S202) The learning model producing unit 22 produces a learning model through machine learning using the training images accepted in step S201.

(Step S203) The learning model output unit 23 outputs the learning model produced in step S202. In this manner, the series of processing for producing a learning model is ended.

Figure 4:
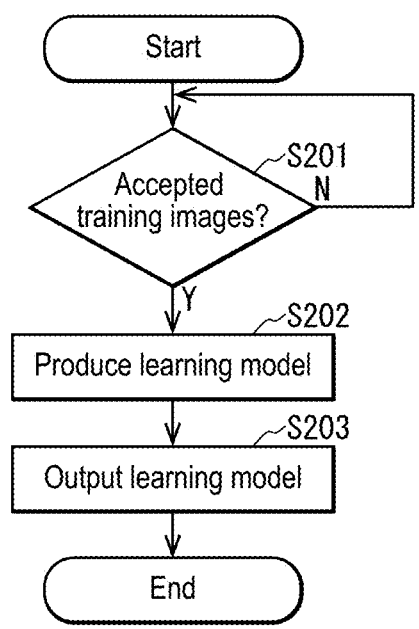
FIG. 4 is a flowchart showing an operation of the learning model producing apparatus according to the embodiment.

The processing order in the flowchart in FIG. 4 is merely an example, and the order of the steps may be changed, as long as similar results can be obtained.

[Next, an operation of the system according to this embodiment will be described by way of a specific example. In this specific example, a case will be described in which count target objects are soybeans.

Figure 5A:
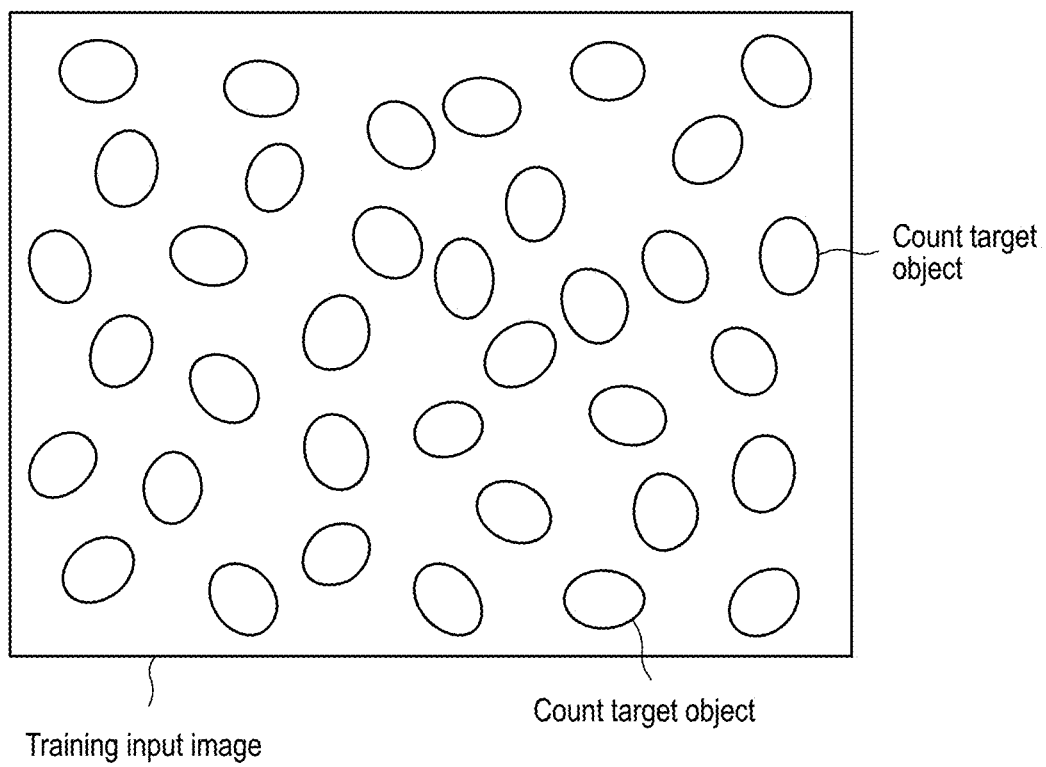
FIG. 5A is a diagram showing an example of a training input image according to the embodiment.
Figure 5B:
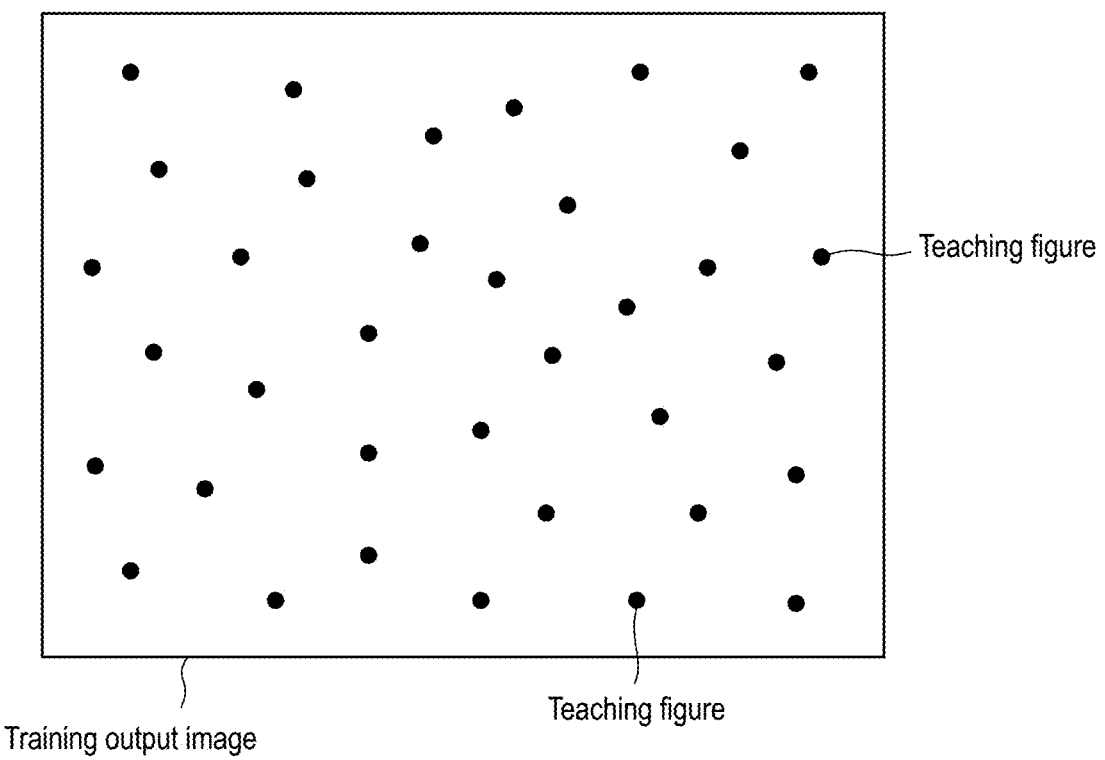
FIG. 5B is a diagram showing an example of a training output image according to the embodiment.
Figure 5C:
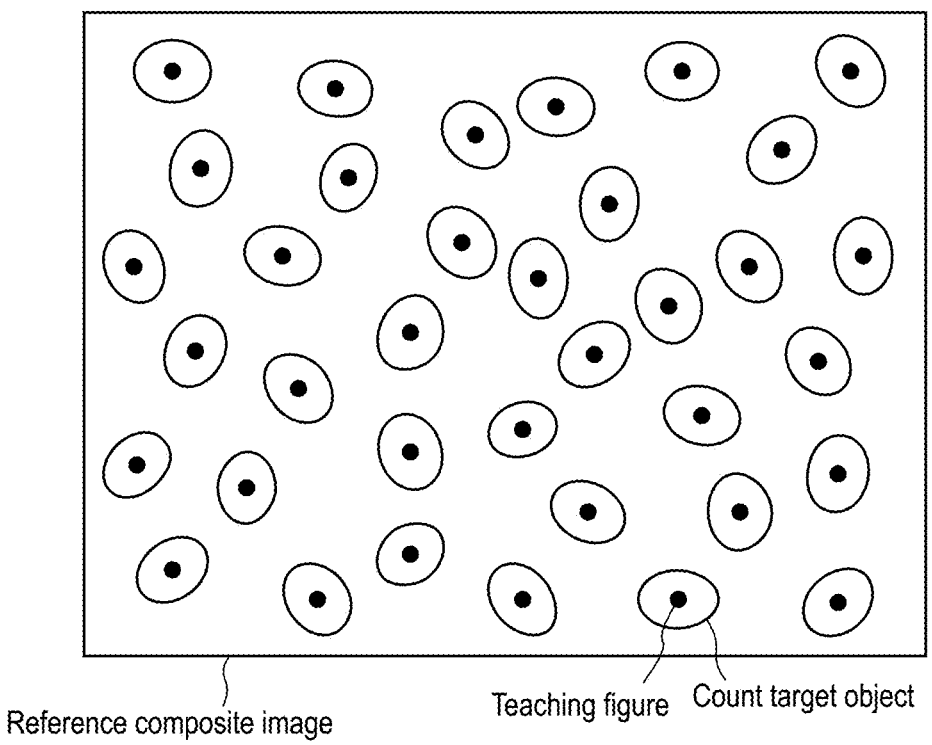
FIG. 5C is a diagram showing an example of a reference composite image according to the embodiment.

First, a user prepares a training input image obtained by capturing an image of soybeans that are count target objects, shown in FIG. 5A. The user manually arranges black disc-like figures that are teaching figures, near the centers of the soybeans contained in the training input image as shown in FIG. 5C, using image processing software or the like. Then, a training output image having multiple teaching figures that are arranged at the positions of the count target objects shown in FIG. 5B is generated. The user prepares multiple pairs of training images by repeating this operation. The multiple pairs of prepared training images are input to the learning model producing apparatus 2, so that learning is started. Then, the multiple pairs of training images are accepted by the training image accepting unit 21 (step S201), and the learning model producing unit 22 produces a learning model using the multiple pairs of training images (step S202). The learning model output unit 23 accumulates the thus produced learning model in an unshown storage medium (step S203).

Figure 10A:
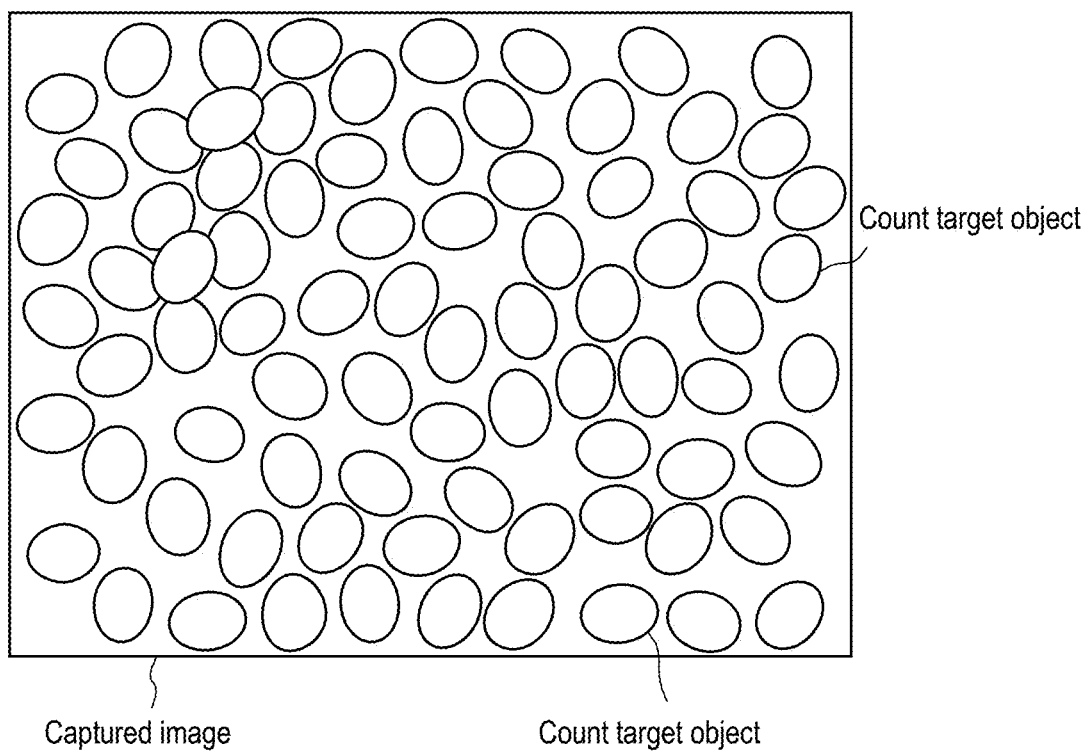
FIG. 10A is a diagram showing an example of a captured image according to the embodiment.
Figure 10B:
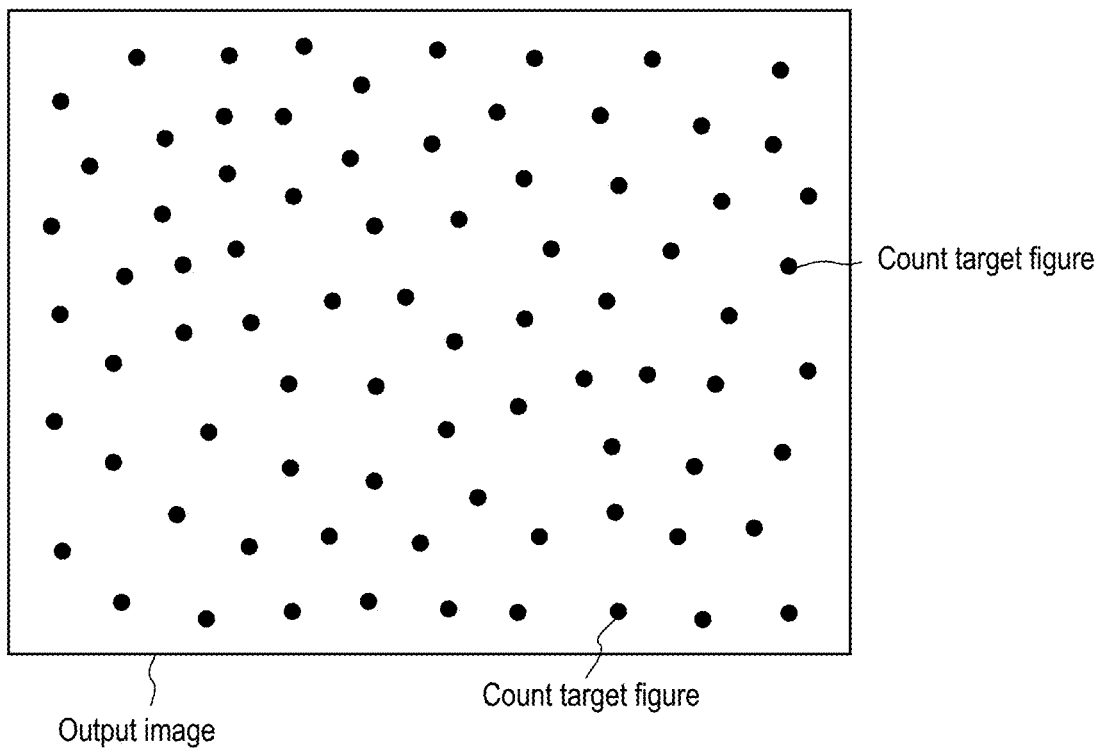
FIG. 10B is a diagram showing an example of an output image according to the embodiment.
Figure 10C:
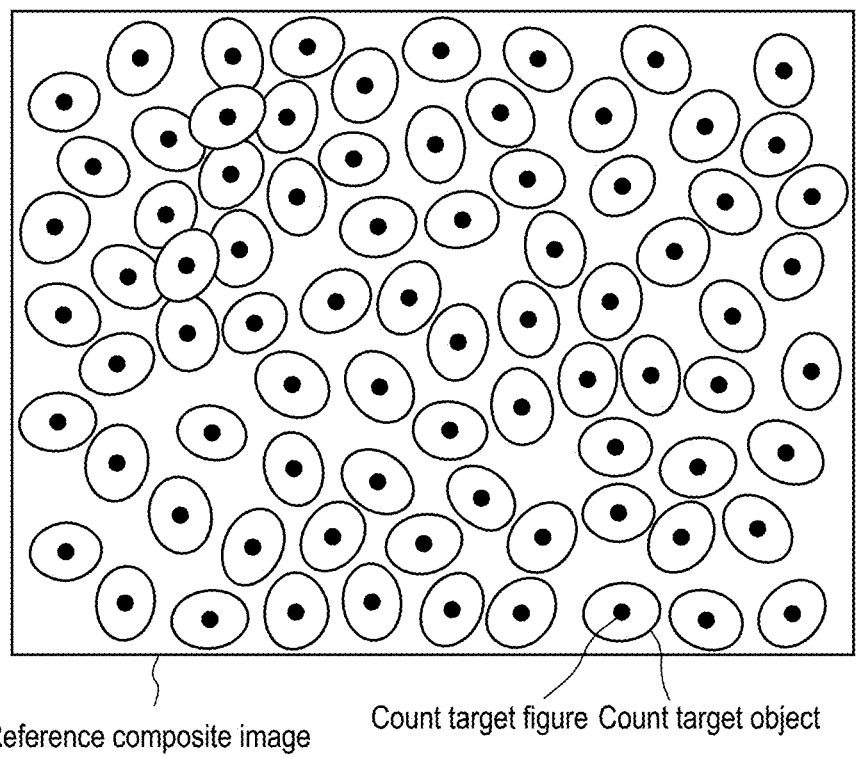
FIG. 10C is a diagram showing an example of a reference composite image according to the embodiment.

Subsequently, it is assumed that the learning model accumulated in the storage medium is accumulated in the storage unit 11 of the counting apparatus 1. Then, an operator of the counting apparatus 1 operates the counting apparatus 1 so as to acquire multiple captured images of soybeans, using an optical system similar to that when the training input image was captured. Then, the captured image acquiring unit 12 acquires a captured image shown in FIG. 10A, by capturing an image in response to the operation (steps S101 and S102). The output image acquiring unit 13 receives the captured image from the captured image acquiring unit 12, and performs calculation of each layer taking the pixels of the captured image as the input layer of the learning model stored in the storage unit 11, thereby acquiring information on the output layer, that is, an output image (step S103). It is assumed that the output image is as shown in FIG. 10B. Then, the counting unit 15 specifies count target figures that are similar to black circle patterns that are teaching figures held in advance, in the output image (step S104). The count target figures may be specified by specifying figures with a similarity to the patterns being greater than or equal to a threshold.

Next, the confidence level acquiring unit 14 acquires a confidence level of each count target figure specified by the counting unit 15 (step S105). As a result, a confidence level is acquired for each count target figure. The counting unit 15 counts the number of count target figures with an acquired confidence level that is greater than a predetermined threshold. For example, if the confidence level acquiring unit 14 acquires N confidence levels, the number (M) of confidence levels that are greater than the threshold, out of the N confidence levels, is counted, and thus the number (M) of count target figures with a confidence level that is greater than the threshold can be acquired. N and M are each an integer of 0 or more, and N≥M. In the case of FIG. 10B, it is assumed that there are 80 count target figures with a confidence level that is greater than the threshold, and the counting unit 15 acquires "80" (step S106). Then, the output unit 16 outputs the number "80" of count target objects (step S107). In this manner, the number of count target objects contained in the captured image is easily and accurately counted.

Figure 15A:
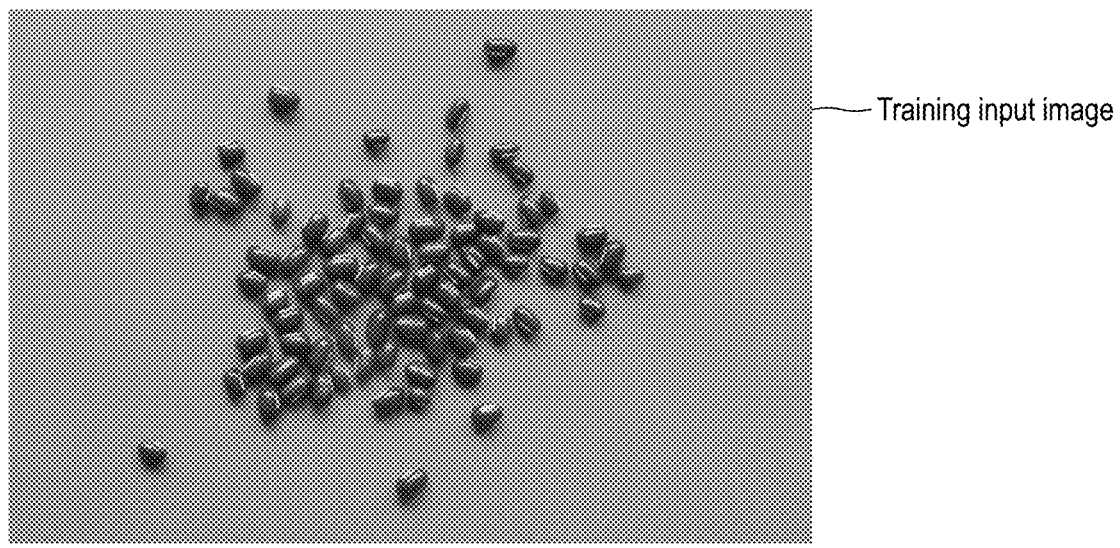
FIG. 15A is a diagram showing an example of a training input image according to the embodiment.
Figure 15B:
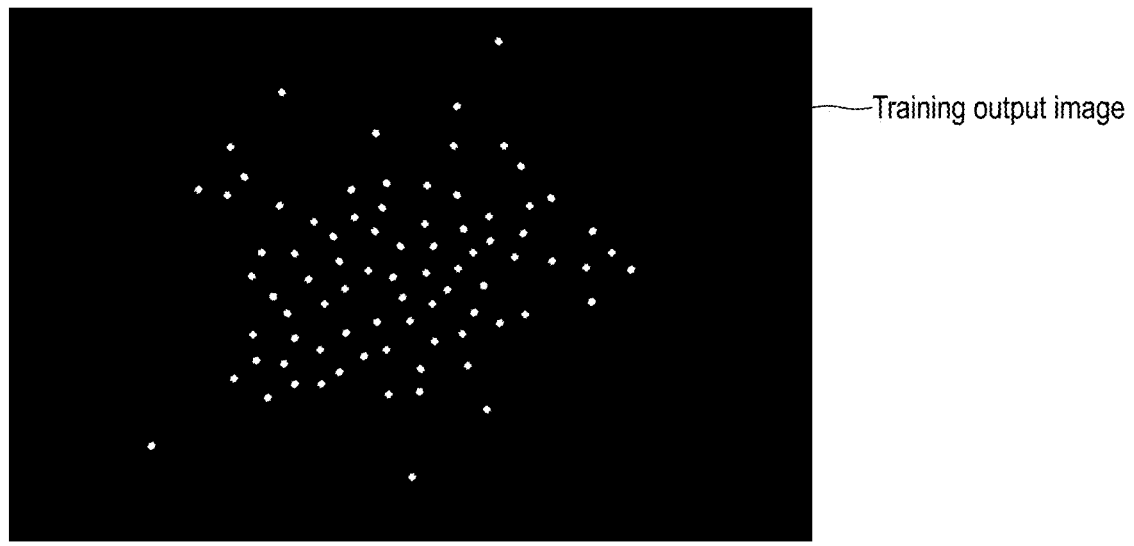
FIG. 15B is a diagram showing an example of a training output image according to the embodiment.
Figure 15C:
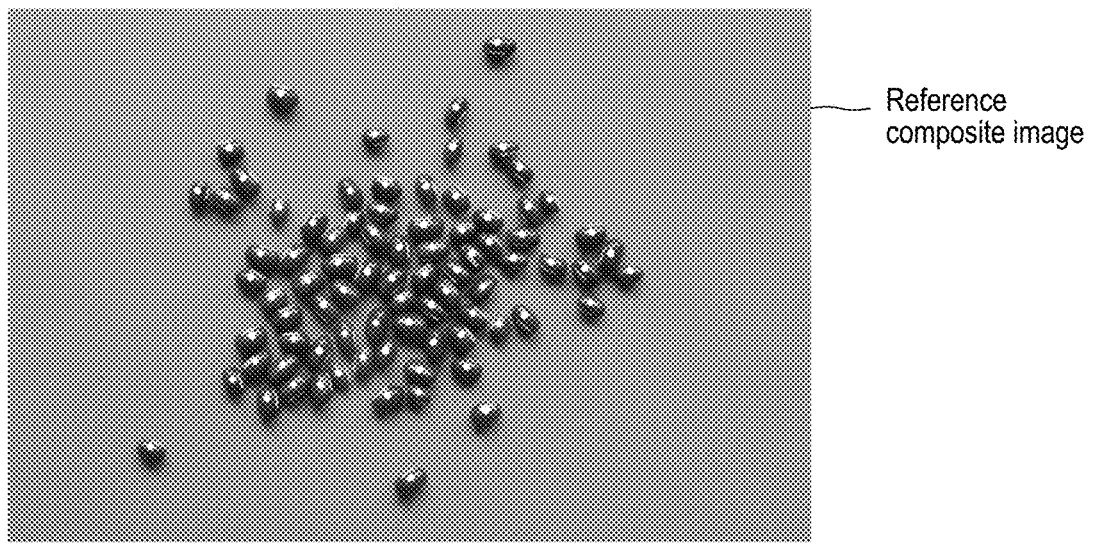
FIG. 15C is a diagram showing an example of a reference composite image according to the embodiment.
Figure 15D:
FIG. 15D is a diagram showing an example of a captured image according to the embodiment.

FIGS. 15A to 15F are training images used for learning by the learning model producing apparatus 2 according to this embodiment, and actual images showing a captured image and an output image used for counting by the counting apparatus 1. FIG. 15A is a training input image obtained by capturing an image of adzuki beans (red beans) that are count target objects. FIG. 15B is a training output image containing teaching figures that are white disc-like figures arranged at the positions of the count target objects in FIG. 15A. FIG. 15C is a reference diagram obtained by compositing the training input image in FIG. 15A and the training output image in FIG. 15B. Such multiple pairs of training input images and training output images were prepared, and the learning model producing apparatus 2 was caused to perform machine learning, so that a learning model for counting adzuki beans was produced.

Figure 15E:
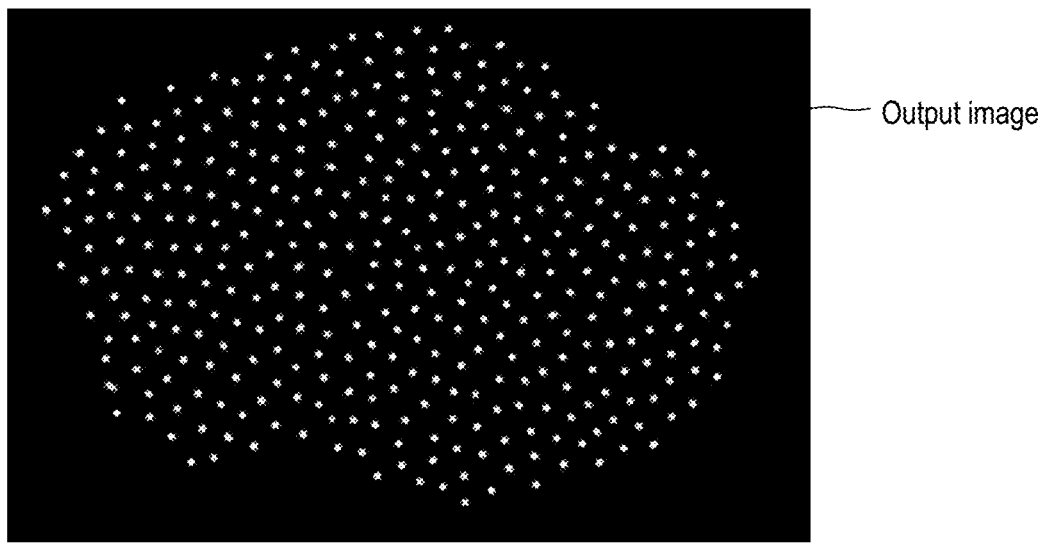
FIG. 15E is a diagram showing an example of an output image according to the embodiment.
Figure 15F:
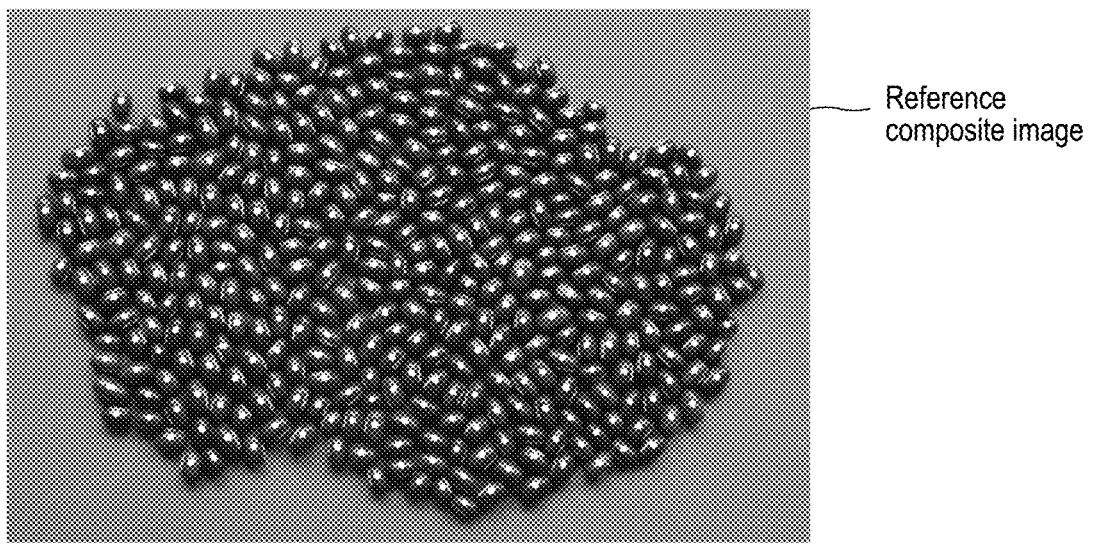
FIG. 15F is a diagram showing an example of a reference composite image according to the embodiment.

Next, the learning model was accumulated in the storage unit 11 of the counting apparatus 1. A captured image of adzuki beans shown in FIG. 15D was acquired and input to the counting apparatus 1, and thus an output image shown in FIG. 15E was acquired. FIG. 15F is a reference diagram obtained by compositing the captured image in FIG. 15D and the output image in FIG. 15E. The count target figures contained in the output image are ideally to be white perfect circles as in the case of the teaching figures in FIG. 15B, but, actually, some of the count target figures are not perfect circles as shown in FIG. 15E. The confidence levels are acquired using the shapes, and the number of count target figures, that is, the number of count target objects is counted using the confidence levels. In this manner, the number of count target objects can be counted.

As described above, with the counting apparatus 1 according to this embodiment, it is possible to accurately count the number of count target objects, by converting count target objects contained in a captured image into count target figures using a learning model, and counting the number of count target figures after the conversion. The reason for this is that, if proper learning results are used, count target objects can be accurately converted into count target figures, as shown in FIG. 15E and the like. It is possible to improve the level of accuracy by perform counting of count target figures using the confidence levels respectively acquired for the count target figures. If learning is performed using a teaching figure that is different for each type of count target objects, it is possible to count the number of count target objects for each type, by using the attributes of the count target figures. If the type is a type in terms of size, it is also possible to perform counting of count target objects for which learning has not been performed.

Furthermore, with the learning model producing apparatus 2 according to this embodiment, it is possible to generate a learning model for use in counting count target objects, using multiple training images. If teaching figures with an attribute that is different for each type of count target objects are used, it is possible to produce a learning model through learning of a smaller number of training images, by setting a pair of a training input image and a training output image so as to contain only one type of count target objects and only one type of teaching figures corresponding thereto.

In this embodiment, the case was described in which a confidence level is also used to perform counting of count target figures, but there is no limitation to this. In this case, the counting unit 15 may count the number of all count target figures contained in an output image, that is, the number of count target objects, without using the confidence levels. In this case, the counting apparatus 1 may not include the confidence level acquiring unit 14.

Figure 16A:
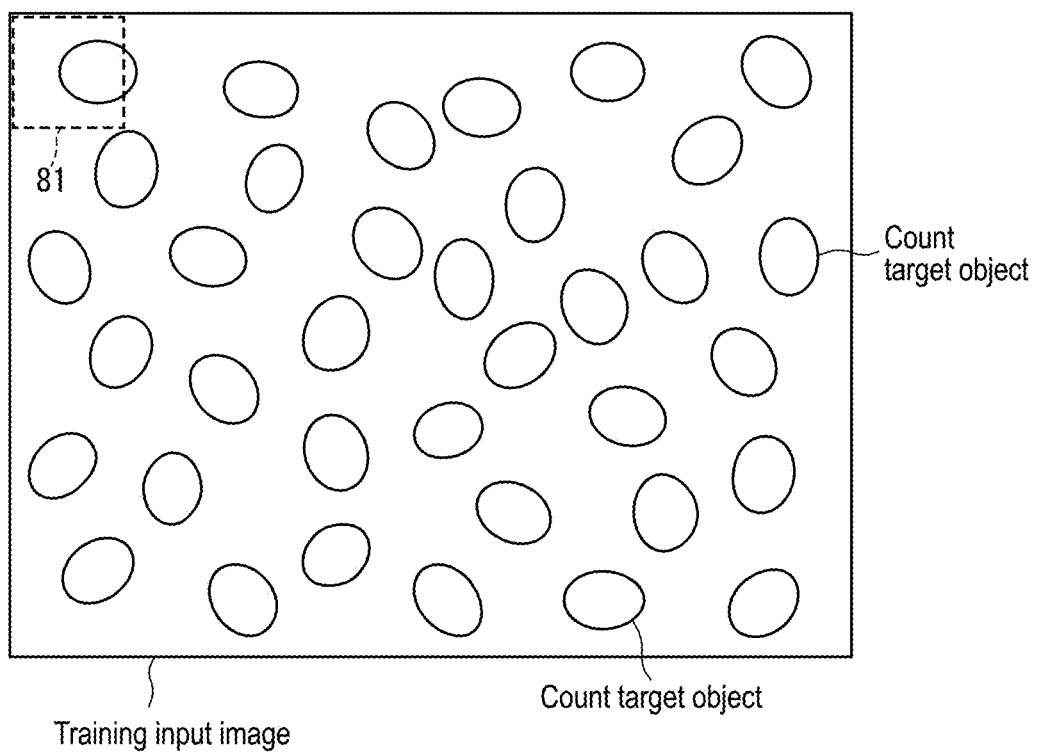
FIG. 16A is a diagram illustrating another example of the machine learning according to the embodiment.
Figure 16B:
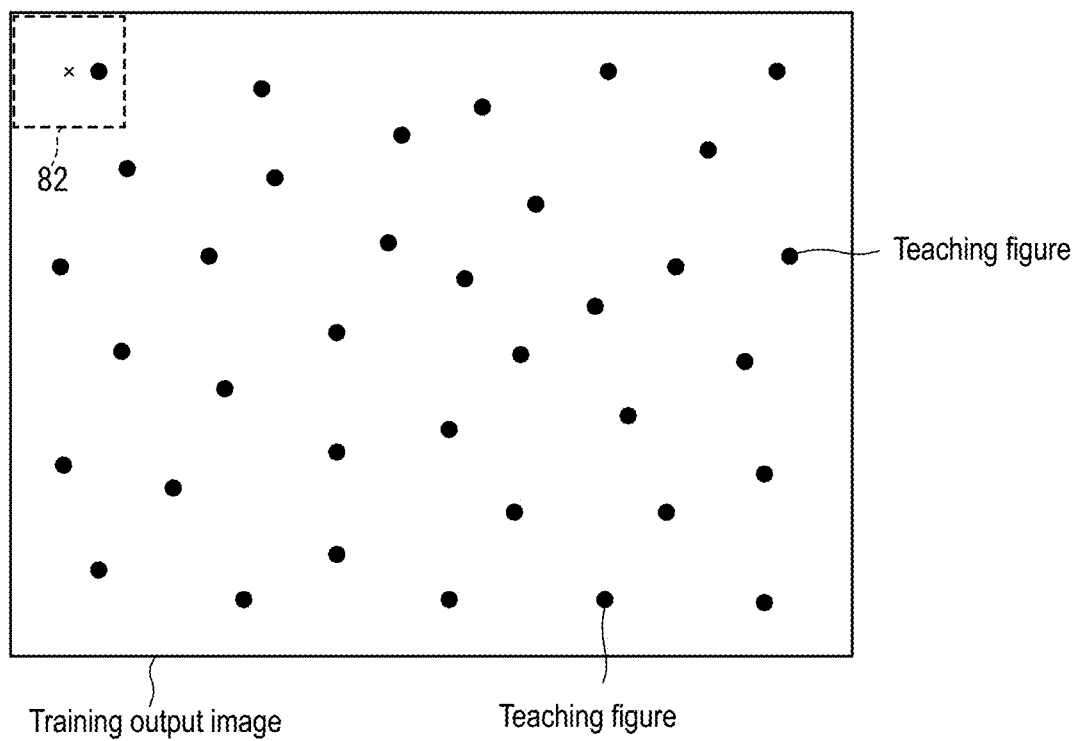
FIG. 16B is a diagram illustrating another example of the machine learning according to the embodiment.

Furthermore, in the foregoing embodiment, the case was mainly described in which a learning model is a learning result of a neural network, but it is also possible that, as described above, a learning model is, for example, a learning result of SVM, SVR, or the like. Hereinafter, a case in which a learning model is a learning result of those other than neural networks will be briefly described. In this example, a case will be described in which a learning model is a learning result of SVM. In that case, for example, in learning using training input images and training output images, learning using predetermined regions 81 and 82 as shown in FIGS. 16A and 16B may be performed. In this learning, it is also possible that a value of each pixel contained in the region 81 shown in FIG. 16A is taken as input, and a pixel value of a representative point (the mark x) in the region 82 shown in FIG. 16B is taken as output. For example, the learning model producing unit 22 may perform learning such that the output is "1" if the pixel of the representative point is black, and the output is "0" (or "−1") if the pixel is white. It is assumed that the position of the region 81 in the training input image corresponds to the position of the region 82 in the training output image.

The representative point of the region 82 may be, for example, a center point, or other point representing the region 82. It is assumed that, in FIG. 16B, the representative point is a center point. In the case of performing SVM learning, the output is typically a binary value, and thus the training output image in FIG. 16B may be a binary image.

Furthermore, the learning model producing unit 22 performs learning while shifting the position of the regions 81 and 82 by one pixel each time. Accordingly, it is possible to perform learning a large number of times, using one pair of a training input image and a training output image. It is assumed that the learning is performed using multiple pairs of training input images and training output images. The regions 81 and 82 may be set to have a size, for example, at which one count target object is contained in each of the regions 81 and 82.

Also in the case of applying a captured image to the learning model, the application is performed to each region as in the case of the region 81. For example, a predetermined region is set to a position in a captured image, and each pixel of the predetermined region is input to the learning model, and thus 1 or 0 (or −1) is output. The output image acquiring unit 13 sets the pixel of a representative point in a region corresponding to the predetermined region, in an output image, to black or white according to the output. It is possible to acquire an output image containing count target figures by performing this processing while shifting the position of the predetermined region in the captured image by one pixel each time. The following processing is as in the case in which a learning model that is a learning result of a neural network is used.

In this manner, in the case of performing SVM learning, for example, learning may be performed such that a pixel value of an N1×N2 region around a pixel (a pixel of a representative point) in a training input image is taken as input, and a pixel value in a training output image, corresponding to the pixel of the representative point is taken as output. Then, an output image may be acquired by inputting the pixel value of the N1×N2 region in the captured image to a learning model to acquire output indicating white or black, setting the pixel value corresponding to the representative point of the N1×N2 region, in the output image, to white or black according to the output, and repeating the setting while shifting the N1×N2 region by one pixel each time. Typically, N1 and N2 are each an integer of 3 or more.

Since ordinary SVM can treat only binary teaching figures, and thus, when treating multi-valued teaching figures, learning may be performed using SVR or SVMs for multi-valued classification.

Furthermore, in the foregoing embodiment, the case was mainly described in which an image is captured such that count target objects of the same type have the same size in a training input image and a captured image, but there is no limitation to this. Even in the case in which the same image capturing conditions are not set for a training input image and a captured image, it is possible to perform counting of count target objects, by performing learning using training input images captured such that count target objects of the same type have various sizes. However, if such learning is performed, it is not possible to perform counting for each size of count target objects.

Furthermore, in the foregoing embodiment, various count target objects were described, but it will be appreciated that the count target objects are not limited thereto and may include other count target objects. Examples of the count target objects are as follows. The count target objects may be, for example, objects that are to be manufactured, objects that are to be produced, objects that are to be hunted, objects that are to be transported, or other count target objects.

Examples of the objects that are to be manufactured include manufactured products and food items. There is no particular limitation on the manufactured products, but examples thereof include screws, bolts, rods, household appliances, stationery (e.g., clips, rubber bands, etc.), toothpicks, and automobile parts. There is no particular limitation on the food items, but examples thereof include confectionery, sausages, bread, noodles, canned goods, bottles, and packed food items.

Examples of the objects that are to be produced include agricultural products and livestock products. There is no particular limitation on the agricultural products, but examples thereof include beans, rice, vegetables, fruits, and seeds. There is no particular limitation on the livestock products, but examples thereof include sheep, goats, cows, chickens, eggs, and cheese.

Examples of the objects that are to be hunted include marine products, and wild birds and animals. There is no particular limitation on the marine products, but examples thereof include fish, shrimp, crabs, and shellfish. There is no particular limitation on the wild birds and animals, but examples thereof include birds that are to be hunted and mammals that are to be hunted.

There is no particular limitation on the objects that are to be transported, but examples thereof include boxes such as cardboard boxes and containers.

There is no particular limitation on other count target objects, but examples thereof include people, automobiles, cells, bacteria, viruses, microorganisms, miorobubbles, nanobubbles, powders, coins, birds, and insects. If the count target objects are, for example, cells, bacteria, viruses, microorganisms, microbubbles, nanobubbles, powders, or the like, the captured image may be, for example, a microscopic image captured using a microscope. There is no particular limitation on the microscope, but examples thereof include an optical microscope, an electron microscope, and an X-ray microscope.

Furthermore, the counting apparatus 1 and the learning model producing apparatus 2 may be stand-alone apparatuses, or server apparatuses in a server-client system. In the case of the latter, the output units, the acquiring units, and the accepting unit may output, acquire, or accept information via a communication line.

Furthermore, in the foregoing embodiment, each process or each function may be realized as centralized processing using a single apparatus or a single system, or may be realized as distributed processing using multiple apparatuses or multiple systems.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown storage medium temporarily or for a long period of time even if not specified in the description above. Furthermore, the information may be accumulated in the unshown storage medium by each constituent element or by an unshown accumulating unit. Furthermore, the information may be read from the unshown storage medium by each constituent element or by an unshown reading unit.

Furthermore, in the foregoing embodiment, if information used in each constituent element or the like, for example, information such as a threshold value, an address, or various setting values used in each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The change instruction may be accepted by the unshown accepting unit, for example, by accepting information from an input device, by receiving information transmitted via a communication line, or by accepting information read from a predetermined storage medium.

Furthermore, in the foregoing embodiment, if two or more constituent elements included in the counting apparatus 1 have a communication device, an input device, or the like, the two or more constituent elements may have a physically single device, or may have different devices. The same applies to the learning model producing apparatus 2.

Furthermore, in the foregoing embodiment, each constituent element may be configured by dedicated hardware, or alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing the storage unit or the storage medium. Software that realizes the counting apparatus 1 according to the foregoing embodiment is a program as follows. Specifically, this program is a program for causing a computer capable of accessing a storage unit in which a learning model is stored, the learning model being trained using multiple pairs of training input images each obtained by capturing an image of multiple count target objects with the same shape, and training output images each containing teaching figures that are arranged at respective positions of the multiple count target objects, to execute: a captured image acquiring step acquiring a captured image of multiple count target objects; an output image acquiring step of acquiring an output image in which the count target objects contained in the captured image are converted into count target figures, by applying the captured image to the learning model; a counting step of counting the number of count target objects, using the multiple count target figures contained in the output image; and an output step of outputting the number of count target objects counted in the counting step.

Software that realizes the learning model producing apparatus 2 according to the foregoing embodiment is a program as follows. Specifically, this program is a program for causing a computer to execute: a training image accepting step of accepting multiple pairs of training input images each obtained by capturing an image of multiple count target objects with the same shape, and training output images each containing teaching figures that are arranged at respective positions of the multiple count target objects; a learning model producing step of producing a learning model through learning of multiple pairs of training input images and training output images; and a learning model output step of outputting the learning model.

Also, in the foregoing embodiment, the functions realized by the above-described programs do not include a function that can be realized only by hardware. For example, the functions of a modem, an interface card, and so on employed by the acquiring unit that acquires information, the accepting unit that accepts information, the output unit that outputs information, and so on, which can be realized only by hardware, are at least not included in the functions realized by the above-described programs.

These programs may be downloaded from a server or the like so as to be executed, or read out from a predetermined recording medium (e.g., an optical disc such as a CD-ROM, a magnetic disk, a semiconductor memory, or the like) so as to be executed. Also, these programs may be used as programs that constitute a program product.

Furthermore, a computer that executes the program may be a single computer or may be multiple computers. That is to say, centralized processing may be performed, or distributed processing may be performed.

Figure 17:
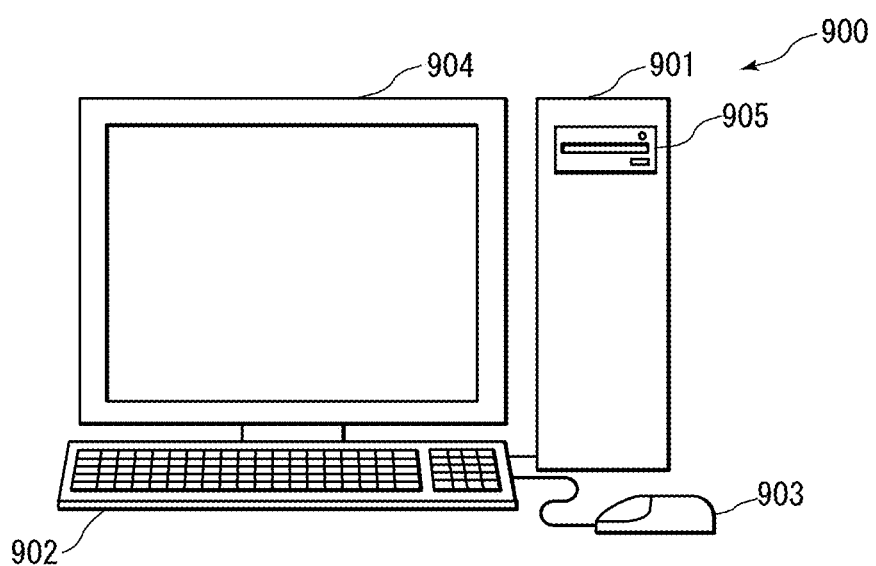
FIG. 17 is a schematic view showing an example of the appearance of a computer system according to the embodiment.

FIG. 17 is a schematic view showing an example of an external view of a computer that executes the programs described above to realize the counting apparatus 1 or the learning model producing apparatus 2 according to the foregoing embodiment. The foregoing embodiment may be realized using computer hardware and computer programs executed thereon.

In FIG. 17, a computer system 900 includes a computer 901 including a CD-ROM drive 905, a keyboard 902, a mouse 903, and a monitor 904.

Figure 18:
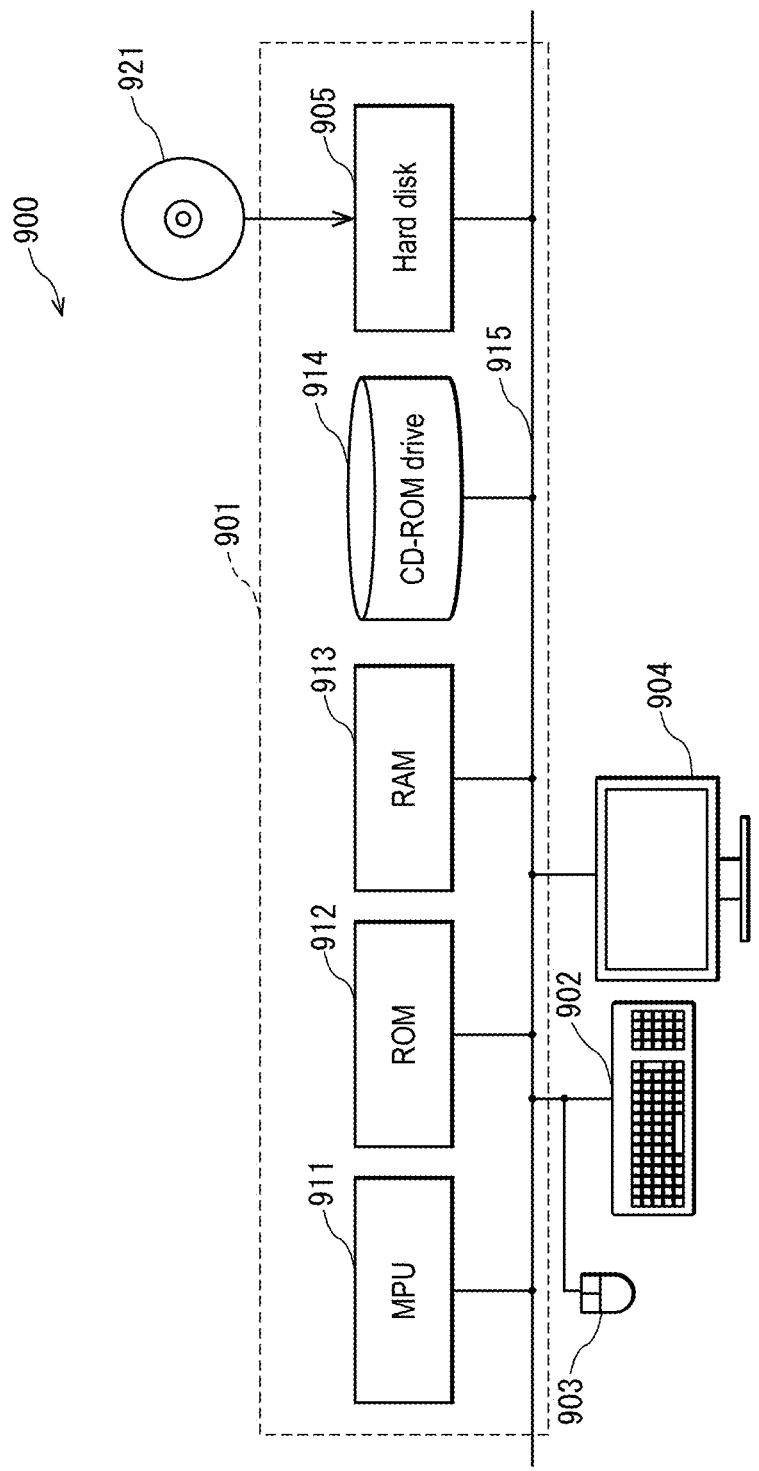
FIG. 18 is a diagram showing an example of the configuration of the computer system.

FIG. 18 is a diagram showing an internal configuration of the computer system 900. In FIG. 18, the computer 901 includes, in addition to the CD-ROM drive 905, an MPU (micro processing unit) 911, a ROM 912 in which a program such as a boot up program is to be stored, a RAM 913 that is connected to the MPU 911 and in which a command of an application program is temporarily stored and a temporary storage area is provided, a hard disk 914 in which an application program, a system program, and data are stored, and a bus 915 that connects the MPU 911, the ROM 912, and the like. Note that the computer 901 may include an unshown network card for providing a connection to a LAN, a WAN, and the like.

The program for causing the computer system 900 to execute the functions of the counting apparatus 1 or the learning model producing apparatus 2 according to the foregoing embodiment may be stored in a CD-ROM 921 that is inserted into the CD-ROM drive 905 and be transferred to the hard disk 914. Alternatively, the program may be transmitted via an unshown network to the computer 901 and stored in the hard disk 914. At the time of execution, the program is loaded into the RAM 913. The program may be loaded from the CD-ROM 921, or directly from a network. The program may be read on the computer system 900 via another storage medium (e.g., a DVD, etc.) instead of the CD-ROM 921.

The program does not necessarily have to include, for example, an operating system (OS) or a third party program to cause the computer 901 to execute the functions of the counting apparatus 1 or the learning model producing apparatus 2 according to the foregoing embodiment. The program may only include a command portion to call an appropriate function or module in a controlled mode and obtain desired results. The manner in which the computer system 900 operates is well known, and thus a detailed description thereof has been omitted.

The present invention is not limited to the embodiment set forth herein. Various modifications are possible within the scope of the invention.

As described above, the counting apparatus and the like according to the present invention have an effect that count target objects can be accurately counted, and thus they are useful as an apparatus and the like for counting count target objects.

The invention claimed is:

1. A counting apparatus comprising:
a non-transitory computer readable medium including a learning model stored thereon, the learning model being trained using multiple pairs of training input images each obtained by capturing an image of multiple count target objects with the same shape, and training output images each containing teaching figures that are arranged at respective positions of the multiple count target objects, the teaching figures being smaller than the count target objects, and a computer program comprising software instructions that, when carried out by a computer;
acquire a captured image of multiple count target objects;
acquire an output image in which the count target objects contained in the captured image are converted into count target figures, by applying the captured image to the learning model;
count the number of count target objects, using the multiple count target figures contained in the output image; and output the number of count target objects.

2. The counting apparatus according to claim 1, wherein the instructions further cause the processor to acquire, for each count target figure contained in the output image, a confidence level that increases in accordance with an attribute of the count target figure being closer to an attribute of a teaching figure,
wherein the number of count target objects counted by the processor comprise a confidence level that is greater than a threshold.

3. The counting apparatus according to claim 2,
wherein there are count target objects of multiple types in terms of size,
the learning model is trained using teaching figures with an attribute that is different for each size of count target objects, and the number of count target objects with a size for which learning has not been performed, are counted using attributes and confidence levels of count target figures contained in the output image.

4. A learning model of a learning result of multiple pairs of training input images each obtained by capturing an image of multiple count target objects with the same shape, and training output images each containing teaching figures that are arranged at respective positions of the multiple count target objects, the teaching figures having an identical shape and an identical size, the teaching figures being smaller than the count target objects,
wherein, upon application of a captured image of multiple count target objects, an output image can be acquired in which the count target objects contained in the captured image are converted into count target figures.

5. A non-transitory computer readable medium, to be installed in a counting apparatus, the counting apparatus comprising a learning model trained using multiple pairs of training input images each obtained by capturing an image of multiple count target objects with the same shape, and training output images each containing teaching figures that are arranged at respective positions of the multiple count target objects, the teaching figures being smaller than the count target objects, the non-transitory computer readable medium including a computer program comprising software instructions that, when carried out by a computer, implement the following steps:
acquiring a captured image of multiple count target objects;
acquiring an output image in which the count target objects contained in the captured image are converted into count target figures, comprising the step of applying the captured image to the learning model;
counting the number of count target objects, using the multiple count target figures contained in the output image; and
outputting the number of count target objects counted in the counting step.

6. A counting method comprising:
a captured image acquiring step of acquiring a captured image of multiple count target objects;
an output image acquiring step of acquiring an output image in which the count target objects contained in the captured image are converted into count target figures, by applying the captured image to a learning model trained using multiple pairs of training input images each obtained by capturing an image of the multiple count target objects with the same shape, and training output images each containing teaching figures that are arranged at respective positions of the multiple count target objects, the teaching figures being smaller than the count target objects;
a counting step of counting the number of count target objects, using the multiple count target figures contained in the output image; and
an output step of outputting the number of count target objects counted in the counting step.

* * * * *